(12) United States Patent  
Yoshino et al.

(10) Patent No.: US 10,698,553 B2  
(45) Date of Patent: Jun. 30, 2020

(54) WRITING INPUT DEVICE

(71) Applicant: SHARP KABUSHIKI KAISHA, Sakai, Osaka (JP)

(72) Inventors: Hiroki Yoshino, Sakai (JP); Katsunori Shirai, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/317,345

(22) PCT Filed: Jul. 13, 2017

(86) PCT No.: PCT/JP2017/025476  
§ 371 (c)(1),  
(2) Date: Jan. 11, 2019

(87) PCT Pub. No.: WO2018/012563  
PCT Pub. Date: Jan. 18, 2018

(65) Prior Publication Data  
US 2019/0302966 A1 Oct. 3, 2019

(30) Foreign Application Priority Data  
Jul. 13, 2016 (JP) .................... 2016-138482

(51) Int. Cl.  
*G06F 3/044* (2006.01)  
*G06F 3/0354* (2013.01)  
(Continued)

(52) U.S. Cl.  
CPC ........ *G06F 3/0446* (2019.05); *G06F 3/03545* (2013.01); *G06F 3/041* (2013.01);  
(Continued)

(58) Field of Classification Search  
CPC ........ G06F 3/0416; G06F 3/041; G06F 3/044; G06F 3/0446; G06F 3/0445; G06F 3/03545; G06K 9/62  
See application file for complete search history.

(56) References Cited

U.S. PATENT DOCUMENTS 5,914,708 A * 6/1999 LaGrange ........... G06F 3/03545  
178/18.06  
6,724,373 B1 * 4/2004 O'Neill, Jr. ......... G06F 3/03545  
345/156  
(Continued)

FOREIGN PATENT DOCUMENTS

JP H08-206958 A 8/1996  
JP H08-286830 A 11/1996  
(Continued)

*Primary Examiner* — Liliana Cerullo  
(74) *Attorney, Agent, or Firm* — ScienBiziP, P.C.

(57) ABSTRACT

An issue addressed is to allow writing input and store drawing information input by writing, thereby increasing the reusability of the drawing information with a simple configuration. There is provided a writing input device including: a marker surface member that allows entry of writing information in ink onto a front surface by writing with a marker pen; a touch sensor member that is disposed on a back surface of the marker surface member and from which information about a position at which the marker pen touches the marker surface member at a time of the writing is obtained; and an input information generation unit that generates input information corresponding to the writing information from the information about the position at which the marker pen touches the marker surface member.

12 Claims, 22 Drawing Sheets

(a)

(b)

(51) Int. Cl.
  *G06K 9/62* (2006.01)
  *G06F 3/041* (2006.01)
  *G06F 3/0488* (2013.01)

(52) U.S. Cl.
  CPC ............ *G06F 3/044* (2013.01); *G06F 3/0416* (2013.01); *G06F 3/0445* (2019.05); *G06F 3/04883* (2013.01); *G06K 9/62* (2013.01)

(56) References Cited

U.S. PATENT DOCUMENTS

| | | | | |
|---|---|---|---|---|
| 2009/0315861 A1* | 12/2009 | Zhang | ................ | G06F 3/03545 345/179 |
| 2010/0053113 A1* | 3/2010 | Wu | .................... | G06F 3/03545 345/174 |
| 2013/0307861 A1* | 11/2013 | Lang | .................. | G06F 3/04883 345/582 |
| 2016/0077613 A1* | 3/2016 | Schwab | ................ | B43K 29/00 345/179 |
| 2016/0355020 A1* | 12/2016 | Yamamoto | ........... | B41J 2/17513 |
| 2017/0031467 A1* | 2/2017 | Kuo | ...................... | G06F 3/0383 |

FOREIGN PATENT DOCUMENTS

| | | |
|---|---|---|
| JP | H09-175085 A | 7/1997 |
| JP | 2010-262340 A | 11/2010 |
| JP | 2011-016326 A | 1/2011 |

* cited by examiner

FIG. 5
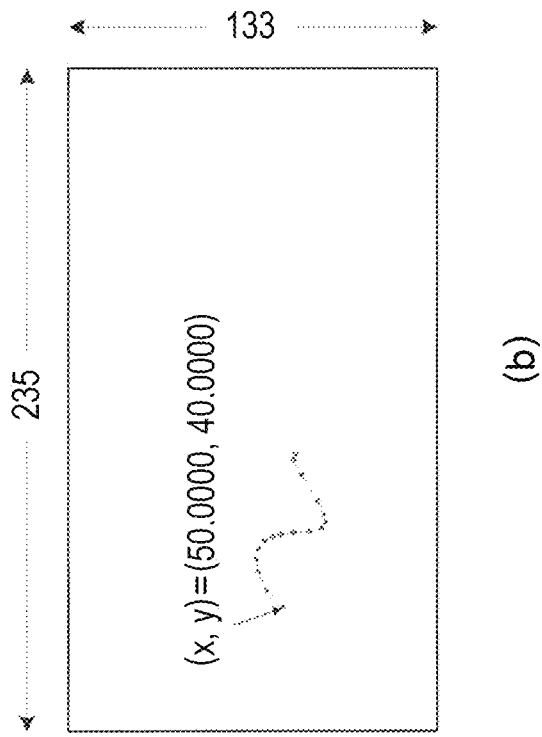
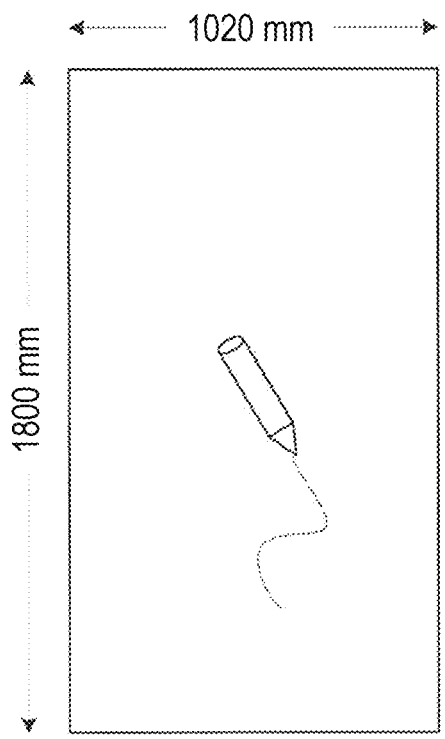

FIG. 8
(a) ERASING MEMBER 51
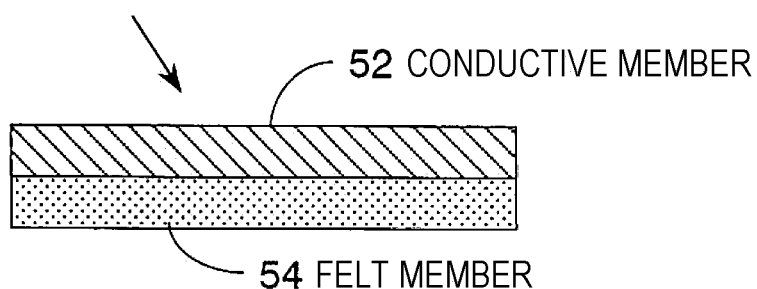
52 CONDUCTIVE MEMBER
54 FELT MEMBER
(b) ERASING MEMBER 51
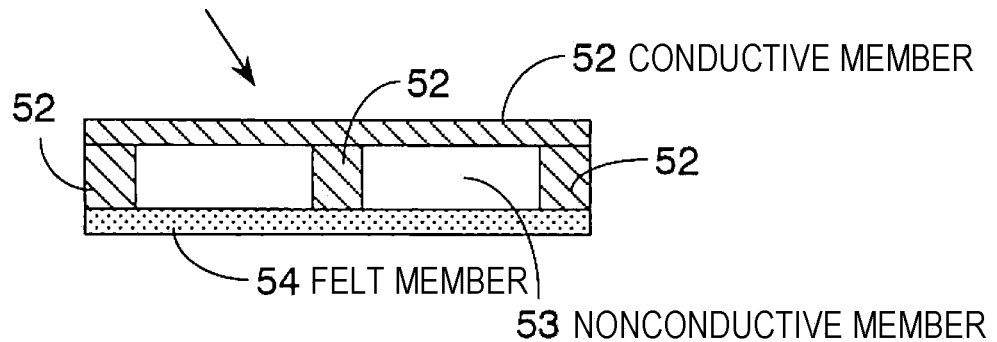
52 CONDUCTIVE MEMBER
54 FELT MEMBER
53 NONCONDUCTIVE MEMBER
(c)
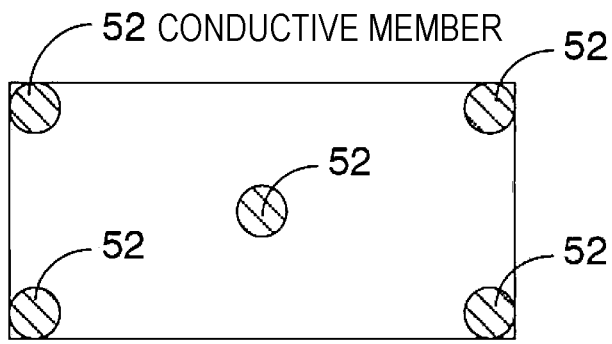
52 CONDUCTIVE MEMBER FIG. 9
(a)
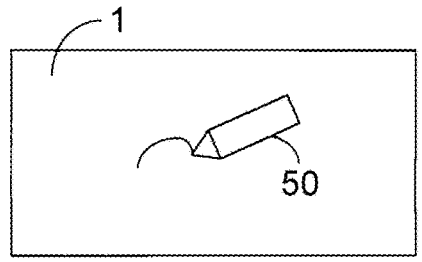
(b)
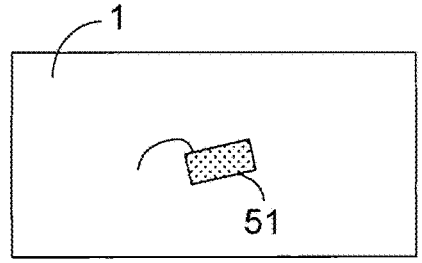
(c) CHANGE IN MAGNITUDE OF CAPACITANCE IN CASE OF PEN INPUT
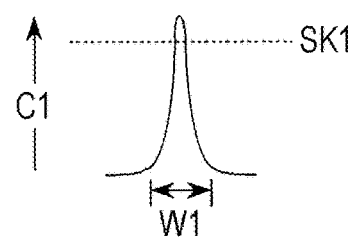
(d) CHANGE IN MAGNITUDE OF CAPACITANCE IN CASE OF ERASER INPUT
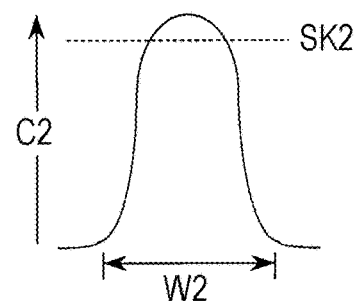

WRITING INPUT DEVICE

TECHNICAL FIELD

The present invention relates to a writing input device and relates to a writing input device capable of storing characters, etc. input by writing.

BACKGROUND ART

As existing methods for electronically inputting characters and illustrations by handwriting, a method of reading information virtually drawn with a finger or an electronic pen and a method of reading information written with an actual pen are known. As a handwriting input device capable of displaying information input by handwriting, a device that includes a display means, such as a display, is available. In an input device that includes a liquid crystal display device as the display, a touch panel and a liquid crystal display panel are stacked and disposed, handwritten characters, etc. virtually drawn on the liquid crystal display panel are input to the input device as position information relating to the touch panel, and the input device stores and displays, on the liquid crystal display panel, the input handwritten characters, etc.

PTL 1 describes an electronic whiteboard device that includes a whiteboard screen formed as an integral structure constituted by a continuous front surface and back surface, allows actual writing of characters, etc. on the front surface of the whiteboard screen with a marker pen, and in a case where a slide start button is pressed, makes the whiteboard screen slide, makes a scanner convert the characters, etc. written on the front surface of the whiteboard screen to image data at the time of sliding, saves the image data, and subsequently erases the characters, etc. written on the front surface of the whiteboard screen to thereby enhance usability and a security function.

CITATION LIST

Patent Literature

PTL 1: Japanese Unexamined Patent Application Publication No. 2011-16326

SUMMARY OF INVENTION

Technical Problem

However, in a case of using a display, a sheet of protection glass, etc. is present on the front. Therefore, when a user draws, the user may have difficulty in inputting because of disparity, and reproducibility or visibility of handwritten characters, etc. may be compromised unlike a case of a whiteboard on which direct writing with an actual pen, such as a marker pen, is performed. Further, depending on the material of a pen tip that is used, writing noise may feel uneasy. When the use of a pen tip results in stains or scratches on the surface of the display, visibility of information displayed on the display is compromised. Therefore, the types of usable pens are limited, and specifically, it is not desirable to use an ink-type marker pen similar to a pen for pen similar to a pen for whiteboards.

Meanwhile, the method of drawing on a whiteboard with a marker is conventionally used as described in PTL 1, etc. In order to save characters, etc. written on the whiteboard screen, it is required to include a scanner, make the whiteboard screen slide, make the scanner read the characters, etc., and save the characters, etc. as image data. In this case, a mechanism for rotating the whiteboard screen is necessary, which is a problem.

Further, it is required to make the scanner perform reading each time written characters, etc. are to be read. Therefore, it is not possible to read characters, etc. in real time while the characters, etc. are input, and there is a lack of a quick response, which is a problem.

Further, the scanner and the mechanism for rotating the whiteboard screen are included, and therefore, the device is complex, and it is difficult to reduce costs.

The present invention has been made in view of the above-described situations, and an object thereof is to provide a writing input device that allows input by writing with a simple configuration without a scanner or a mechanism for rotating a whiteboard screen.

Solution to Problem

The present invention provides a writing input device including: a marker surface member that allows entry of writing information in ink onto a front surface by writing with a marker pen; a touch sensor member that is disposed on a back surface of the marker surface member and from which information about a position at which the marker pen touches the marker surface member at a time of the writing is obtained; and an input information generation unit that generates input information corresponding to the writing information from the information about the position at which the marker pen touches the marker surface member.

Further, the touch sensor member is a capacitive touch sensor.

Further, the touch sensor member detects a capacitance change caused by a tip of the marker pen saturated with an ink touching the front surface of the marker surface member.

Further, the ink contains a solvent that contains a main ingredient having a relative permittivity of 10 or more.

Further, the marker surface member is formed of a resin material.

Further, the marker surface member has a thickness of 1.0 mm or more and 10.0 mm or less.

Further, the writing input device further includes a protection member that protects the touch sensor member, the protection member being disposed on a surface of the touch sensor member opposite to a surface of the touch sensor member on which the marker member is located.

Further, the protection member is formed of a foamed resin or a corrugated plate.

Further, the protection member has a thickness of 10.0 mm or more and 50.0 mm or less.

Further, the input information generation unit determines a touch operation to be an input operation in a case where a capacitance change is larger than a predetermined first threshold and smaller than a predetermined second threshold, and determines a touch operation to be an operation other than an input operation in a case where a capacitance change is a change larger than the second threshold.

Further, the input information generation unit distinguishes an input operation and an erase operation from each other by using a magnitude of a capacitance change, and in a case where the input information generation unit determines that an erase operation has been performed, erases the input information that corresponds to a part for which the erase operation has been performed.

Further, the erase operation is performed with an erasing member; the erasing member has a size of a predetermined area or more, and includes a conductive member for causing a capacitance change on the marker surface member and a wipe-off part for erasing an ink of the marker pen applied to the marker surface member; and in a case where the erase operation has been performed, the writing information entered onto the front surface of the marker surface member is erased with the wipe-off part, and simultaneously, the input information that corresponds to the part for which the erase operation has been performed is erased.

Further, the writing input device further includes a communication unit that transmits the input information to an external device.

Further, the input information includes input coordinate data of the position at which the marker pen touches the marker surface member and image data generated by using the input coordinate data; and in addition to the input coordinate data, the input information includes attribute information that is information with which a touch state is distinguishable.

Further, the present invention provides a writing input device including: an input unit constituted by a marker board film that allows entry of information by writing and a touch sensor that is disposed on a back surface of the marker board film and from which information about a capacitance at a position touched at a time of the entry is obtained; a capacitance change sensing unit that senses a capacitance change from the information obtained from the touch sensor; a touch position detection unit that detects a position of a touched region on the basis of the sensed capacitance change, and obtains input coordinate data of the position; a shape determination unit that determines a shape of the touched region on the basis of the sensed capacitance change; and a storage unit that stores, on the basis of the obtained input coordinate data and the determined shape, drawing information input by writing.

Advantageous Effects of Invention

According to the present invention, it is possible to provide a writing input device that allows input by writing with a simple and low-cost configuration.

Further, when a user enters writing information onto a marker board film, the position of the touched region is detected on the basis of a capacitance change detected from information obtained from a touch sensor disposed on the back surface of the marker board film, input coordinate data of the position is obtained, the shape of the touched region is determined, and drawing information input by writing is stored on the basis of the obtained input coordinate data and the determined shape. Therefore, it is possible to allow input by writing, store information input by writing, and increase the reusability of the information input by writing with a simple and low-coast configuration without a special configuration for obtaining drawing information, such as a scanner or a mechanism for rotating a whiteboard screen.

BRIEF DESCRIPTION OF DRAWINGS

FIG. 5 includes diagrams illustrating an example of input by writing with a marker pen.

FIG. 8 includes diagrams illustrating example configurations of an erasing member (eraser).

FIG. 9 includes diagrams schematically illustrating an example of a shape determination process performed by a shape determination unit.

DESCRIPTION OF EMBODIMENTS

Hereinafter, embodiments of the present invention will be described with reference to the drawings. Note that the present invention is not limited by the following description of examples.

FIRST EXAMPLE: CONFIGURATION OF WRITING INPUT DEVICE INCLUDING MARKER BOARD FILM

Figure 1:
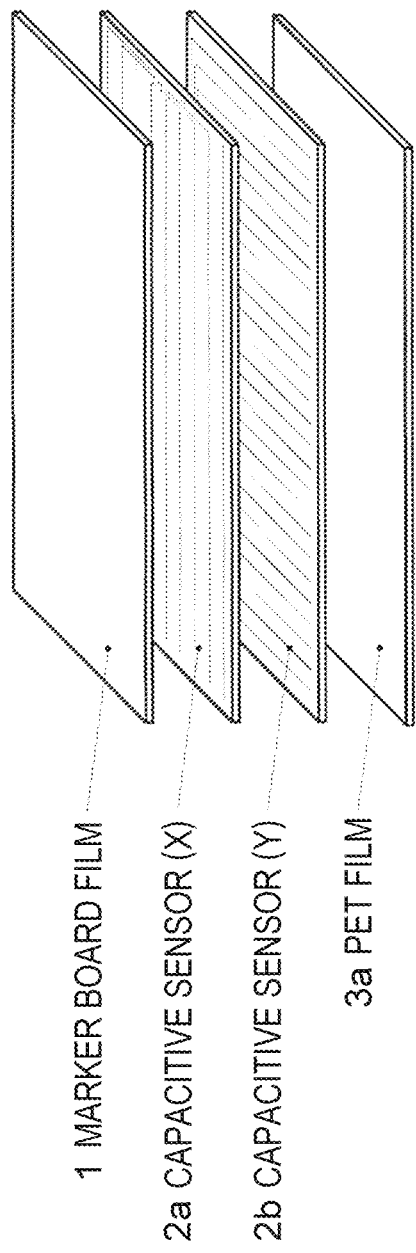
FIG. 1 is a schematic diagram illustrating a configuration of a writing input device according to an example of the present invention.

FIG. 1 is a schematic diagram illustrating a configuration of a writing input device according to an example of the present invention.

FIG. 1 illustrates a part corresponding to an input unit 10 of a writing input device 100 described below with reference to FIG. 3 and is a perspective view of disassembled constituent elements for the purpose of illustration.

This figure illustrates the input unit 10 of the writing input device 100 formed by stacking a marker board film 1, a touch sensor 2 formed of a capacitive sensor (X) 2a and a capacitive sensor (Y) 2b, and a protection member 3, such as a PET film 3a, in this order. In addition to the input unit 10, the writing input device 100 further includes a control device (not illustrated) that obtains information about writing input from the input unit 10.

The marker board film 1 is a board onto which information can be entered by writing, and is a part to which a user directly inputs characters, illustrations, etc. by writing.

The marker board film 1 is a film that is surface-treated so that writing can be performed with a commercially available marker pen for whiteboards and so that written information can be erased with a predetermined erasing member (eraser), a user's finger, etc. As the material, a material made of, for example, a vinyl chloride resin may be used.

The touch sensor 2 is a part from which information about a touched position is obtained in a case where the user performs input by writing with an input implement, such as a marker pen. Theoretically, various types of touch sensors for sensing a touch, such as a capacitive type, a resistive type, a surface acoustic wave type, and an electromagnetic induction type, can be used.

However, a description of an example case of employing a capacitive type is given in this example. The ink of a marker pen has weak conductivity. Therefore, in a case where the tip of a marker pen saturated with an ink touches an entry surface, the touch of the ink on the entry surface results in a capacitance change. Accordingly, the inventors have found as a result of a study that, when a marker pen and a capacitive touch sensor are combined, positions at which the marker pen touches the entry surface can be detected along a shape formed with the ink applied during writing with a higher precision than in a case of employing the other types.

Note that the inventors have found as a result of a study that, in a case of using a capacitive type, the relative permittivity of the ink of the marker pen is desirably 10 or more in order to detect a capacitance change with high precision. The relative permittivity of the ink is substantially equal to the relative permittivity of the main ingredient of the solvent, that is, an ingredient having the largest weight ratio among the ingredients of the solvent, and therefore, the condition of the relative permittivity can be satisfied by using water or alcohol as the main ingredient of the solvent.

In this embodiment, the touch sensor 2 is mainly formed of one set of capacitive sensors (the capacitive sensor 2a (hereinafter also referred to as "X sensor") and the capacitive sensor 2b (hereinafter also referred to as "Y sensor")).

The touch sensor 2 is disposed on the back surface of the marker board film 1, and information about the capacitance at a position touched at the time of entry onto the marker board film is obtained therefrom.

The one set of capacitive sensors that constitute the touch sensor includes two capacitive sensors (X sensor 2a and Y sensor 2b) each formed of electrode lines that are orthogonal to the electrode lines of the other. The two capacitive sensors are stacked and disposed so as to be in contact with the back surface of the marker board film.

The two capacitive sensors (X sensor 2a and Y sensor 2b) are each formed of the electrode lines for detecting capacitance changes, the electrode lines of one of the two capacitive sensors being arranged in parallel along one of the two axes (X axis and Y axis) that are orthogonal to each other, the electrode lines of the other capacitive sensor being arranged in parallel along the other axis. In each of the capacitive sensors, electrodes for detecting capacitance changes are formed on a PET (polyethylene terephthalate) substrate, and the electrodes of one of the capacitive sensors are orthogonal to those of the other.

Each region in which a corresponding one of the electrode lines of the X sensor and a corresponding one of the electrode lines of the Y sensor cross each other corresponds to the position of one sensor, and a plurality of sensors are disposed in a matrix. Information about the capacitance in each region in which a corresponding one of the electrode lines of one of the two capacitive sensors and that of the other capacitive sensor cross each other is obtained, and the obtained information about the capacitance is output to a sensor driving unit described below.

In a case where the marker board film 1 is touched with, for example, a marker pen, a change in a mutual capacitance formed between a corresponding one of the electrodes of the X sensor and a corresponding one of the electrodes of the Y sensor orthogonal to each other is detected to thereby detect the touch.

The capacitive sensor (X sensor) 2a is a sensor for detecting the coordinate of the touched position in an X-axis direction, and the capacitive sensor (Y sensor) 2b is a sensor for detecting the coordinate of the touched position in a Y-axis direction.

As the material and shape of the capacitive sensors, a transparent and conductive ITO (tin-doped indium oxide) film or, for example, copper wires having a mesh structure or silver nanowires may be used.

Further, the X sensor and the Y sensor may be formed on the respective sides of one PET substrate.

Figure 17:
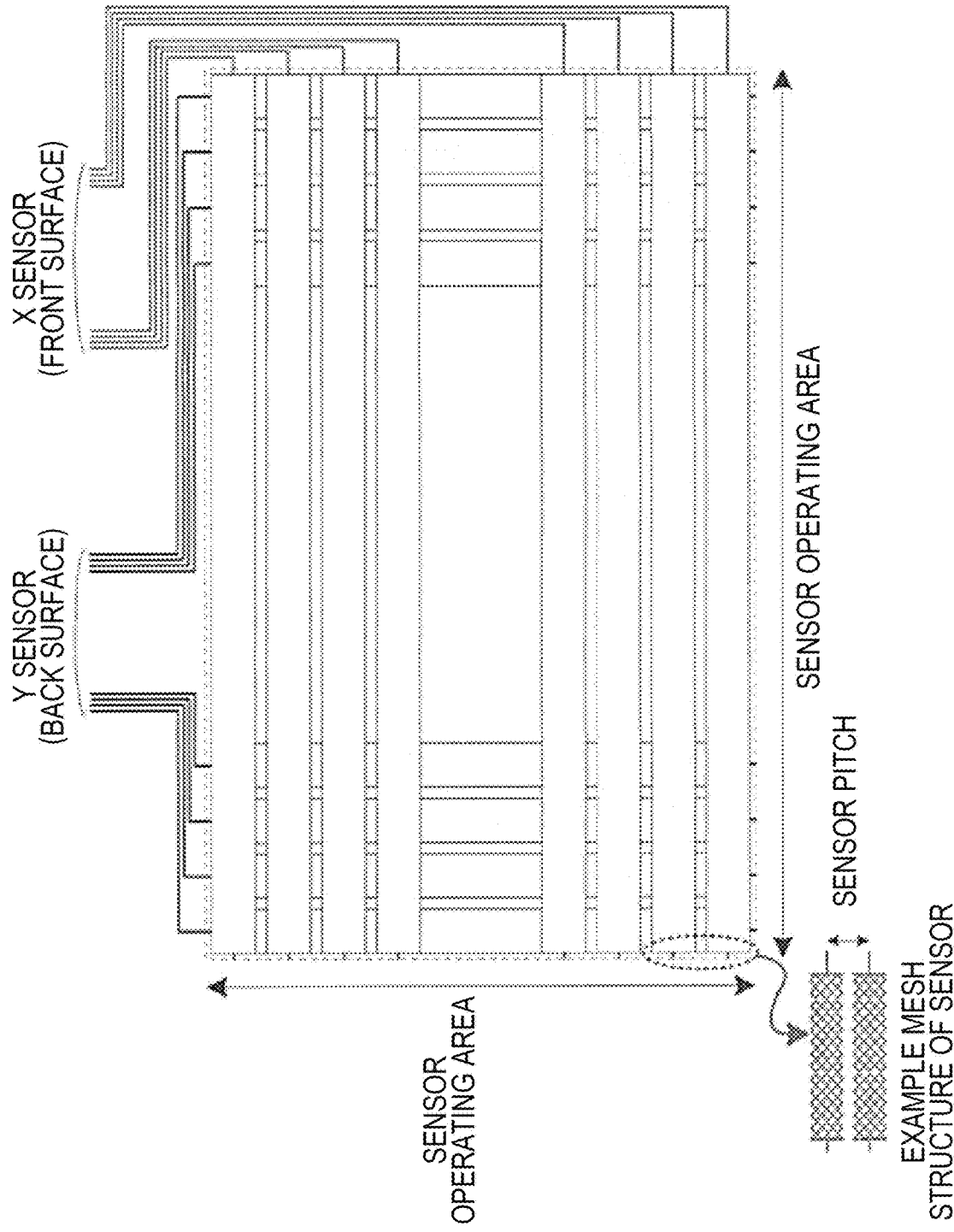
FIG. 17 is a schematic diagram illustrating an example configuration of a touch sensor.

FIG. 17 is a schematic diagram illustrating an example configuration of the touch sensor 2.

This figure illustrates a configuration in which the X sensor is disposed on the front surface of one PET substrate and the Y sensor is formed on the back surface of the PET substrate. In the X sensor, a plurality of laterally long and narrow electrode lines are arranged in the longitudinal direction. In the Y sensor, a plurality of longitudinally long and narrow electrode lines are arranged in the lateral direction. A region at each point at which a corresponding one of the electrode lines of the X sensor and a corresponding one of the electrode lines of the Y sensor cross each other forms one sensor. Further, each electrode line is formed as a mesh structure, as illustrated in the bottom left part of the figure. Wiring lines extended from the respective electrode lines are put together and connected to the sensor driving unit described below.

The protection member 3 is a member for protecting the touch sensor 2 and is stacked and disposed so as to be in contact with the touch sensor 2 on a surface of the touch sensor 2 different from a surface thereof that is in contact with the marker board film. As the protection member 3, for example, the PET film 3a is used.

The PET film 3a is a member for protecting the touch sensor 2 at the rear of the touch sensor 2. In a case where the writing input device is used as a whiteboard or a blackboard used in a classroom, the PET film 3a is formed on the back surface opposite the marker board film 1.

However, in a case of using, for example, a wall, a board, or a desk on the back surface as a protection member for the back surface or in a case of attaching a substitute that can serve as the protection member to the back surface of the touch sensor 2, the protection member 3 need not be disposed.

In this case, for example, when a part constituted by the marker board film 1 and the touch sensor 2 formed of the capacitive sensor (X) 2*a* and the capacitive sensor (Y) 2*b* is attached to, for example, a wall or put on a desk, input by writing can be performed.

In a case of a configuration without the protection member 3, the weight is relatively light, and the installation location need not be fixed. In a case where the size of the marker board film 1 for input by writing small, the writing input device can be portable by a user. The marker board film 1 for input by writing usually has a rectangular shape; however, the size thereof can be flexibly reduced by removing an unnecessary part of the touch sensor 2 while leaving a part in which the wiring lines extended from the respective electrode lines are put together and connected to the sensor driving unit. Further, the marker board film 1 can be cut so as to have a shape other than a rectangular shape. That is, a small and light portable writing input device for which the user can flexibly set the size and shape in accordance with the installation location can be formed.

Figure 2:
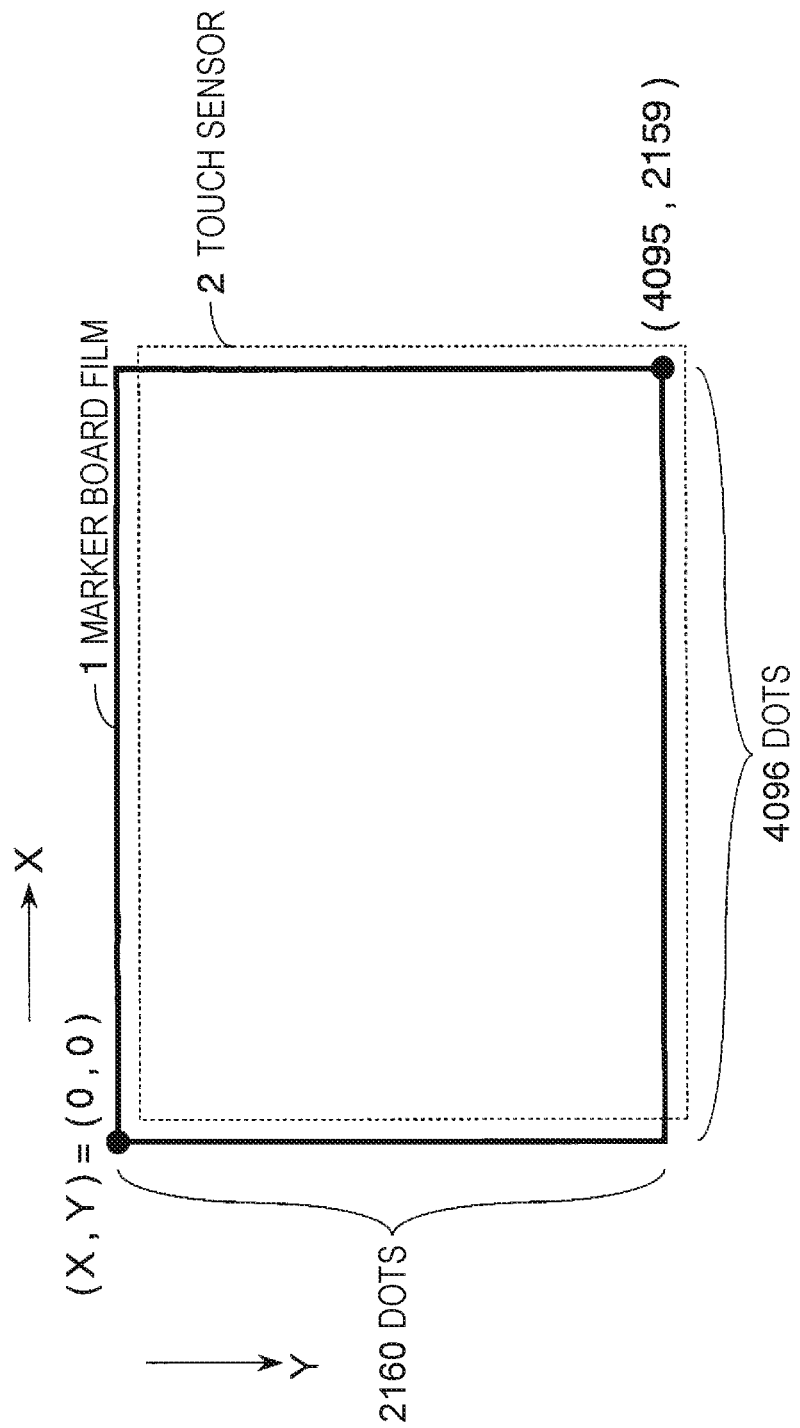
FIG. 2 is a diagram illustrating a capacitive touch panel.

FIG. 2 is a diagram illustrating a capacitive touch panel.

FIG. 2 illustrates the marker board film 1 and the touch sensor 2 disposed at the rear of the marker board film 1.

Although the touch sensor 2 is actually disposed in contact with the back side of the marker board film 1, this figure illustrates the marker board film 1 and the touch sensor 2 shifted from each other for the purpose of illustration.

In general, in a touch panel, touch sensors on the back of the display surface are scanned for each screen (for each frame) to detect the coordinates of a touched position. Hereinafter, a screen that is scanned in a capacitive sensor is referred to as a scan surface.

When a conductive object comes close to a scan surface, the capacitance at a position to which the object comes close changes and becomes different from the capacitances at the other positions. The coordinates of the position at which the capacitance changes are detected.

As described above, the touch sensor 2 is constituted by two capacitive line sensors and includes the sensors that are disposed in a matrix in the X-axis direction and the Y-axis direction orthogonal to each other, and the capacitance between the object coming close and the line sensors is detected, thereby detecting the coordinates of the touched position. Further, in a case where the touched position has a predetermined area, it is possible to also detect the shape of the object coming close.

For example, when it is assumed that the resolution along the X axis in the lateral direction is 4096 dots and the resolution along the Y axis in the longitudinal direction is 2160 dots as illustrated in FIG. 2, it is possible to distinguish and detect 4096×2160 sensor positions.

When it is assumed that the XY coordinates (X, Y) of the top left position are (0, 0) and the XY coordinates (X, Y) of the bottom right position are (4095, 2159), the capacitance is detected for each set of XY coordinates from the touch sensor 2.

Any object having conductivity can be used as an input implement for the device. Examples of an object having conductivity include a dedicated marker pen for drawing lines with a conductive ink, an erasing member (eraser), and a person's fingertip.

Figure 3:
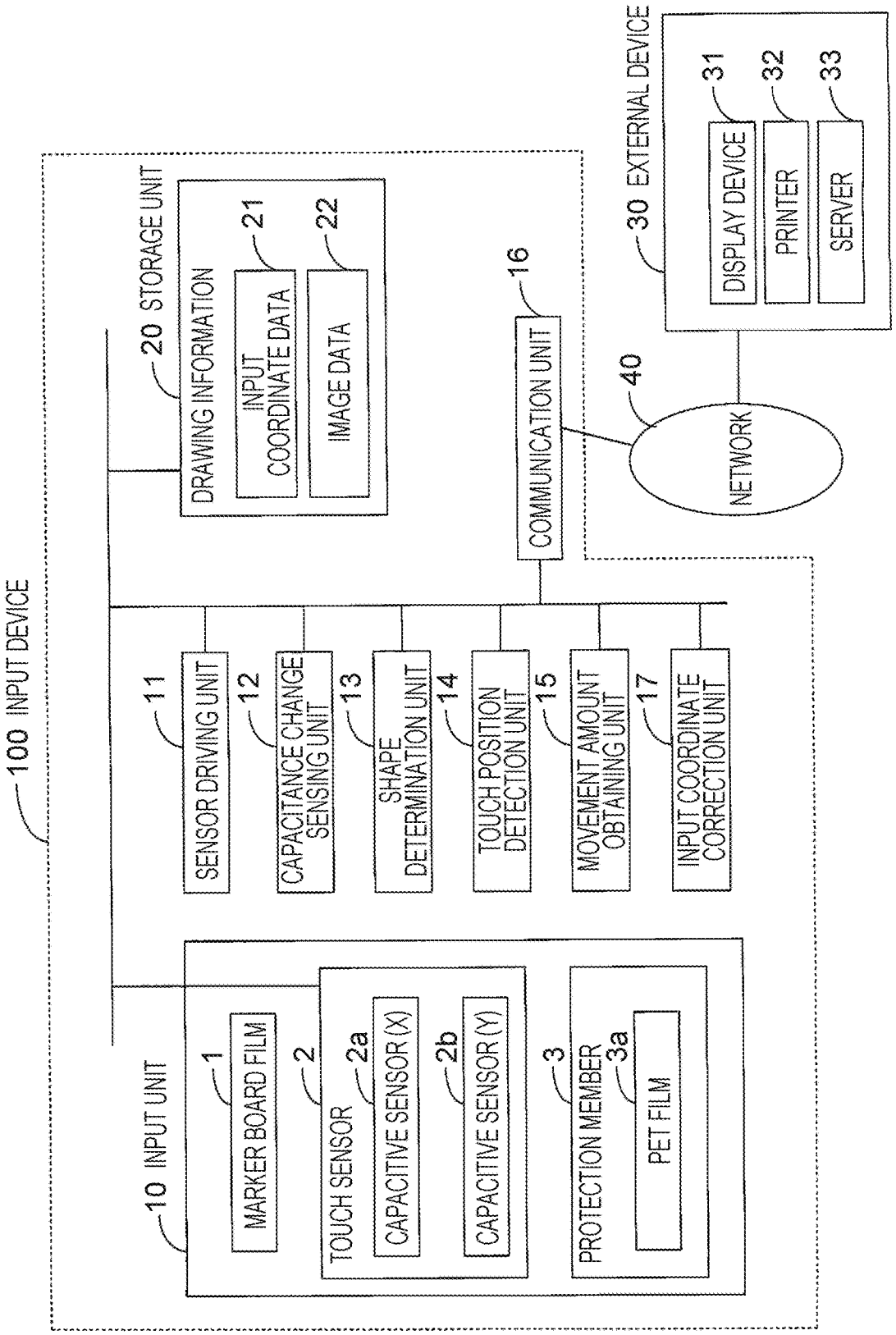
FIG. 3 is a block diagram of the writing input device according to the example of the present invention.

FIG. 3 is a block diagram of the handwriting input device according to the example of the present invention.

In FIG. 3, the handwriting input device 100 of the present invention mainly includes the input unit 10, a sensor driving unit 11, a capacitance change sensing unit 12, a shape determination unit 13, a touch position detection unit 14, a movement amount obtaining unit 15, a communication unit 16, an input coordinate correction unit 17, and a storage unit 20.

The constituent elements other than the input unit 10 are included in the control device described above.

Further, the handwriting input device 100 may have a function of making a connection with an external device 30 that is installed in a remote building or in another room or another section in the same building via a network 40 and transmitting information input by handwriting to the external device 30.

The external device 30 includes, for example, a display device 31, a printer 32, and a server 33.

The display device 31 may be, for example, a monitor device of a size approximately the same as the size of a television screen, a display used in a videoconference in a remote place, a large-sized display viewed by a large number of viewers, or a projector.

Although not illustrated, as a control unit of the handwriting input device, a microcomputer constituted by a CPU, a ROM, a RAM, an I/O controller, a timer, etc. is included to control operations of the constituent elements including the input unit 10, the sensor driving unit 11, etc. described above.

In accordance with a control program stored in advance in the ROM, etc., the CPU organically operates various hardware units to execute a handwriting input function, a shape determination function, a communication function, etc. of the present invention.

The input unit 10 is constituted by the marker board film 1, the touch sensor 2 formed of the capacitive sensor (X) 2*a* and the capacitive sensor (Y) 2*b*, and the protection. member 3, such as the PET film 3*a*, as illustrated in FIG. 1.

The sensor driving unit 11 is a part that drives the two capacitive sensors forming the touch sensor 2 and obtains capacitance information output from the capacitive sensors. The sensor driving unit 11 drives the capacitive sensors, for example, at a rate corresponding to a frame rate, which indicates the number of frames detected by each capacitive sensor per unit time.

The capacitance change sensing unit 12 is a part that senses a capacitance change from the information obtained from the touch sensor 2 and, in case where the obtained capacitance has changed at a sensor position, detects touch input performed at the sensor position.

The shape determination unit 13 is a part that determines the shape of a region in which a sensor responds while reflecting the shape of a touching object, that is, determines the shape of the object, on the basis of a capacitance change sensed by the capacitance change sensing unit 12. On the basis of mainly the size of the determined shape, the shape determination unit 13 determines whether the object used in handwriting input is a pen, a finger, user's manual input (an erroneous touch, that is, an unintended touch), or an eraser. However, the types of shapes determined as a result of sensing by the sensors for determining an object are not limited to these, and other objects may be distinguished and determined to be objects of other types.

The touch position detection unit 14 is a part that detects a touch position on the marker board film 1. The touch position detection unit 14 detects the position of a region that is touched with an input member (pen, finger, eraser, etc.) with which a handwriting input operation is performed, on the basis of a sensed capacitance change and obtains input coordinate data of the position at which input by handwriting is performed.

Further, the input coordinate data is associated with attribute information indicating a pen, a finger, an erroneous touch, an eraser, etc. that is determined by the shape determination unit 13 to generate drawing information.

The movement amount obtaining unit 15 is a part that obtains, for each frame, the movement amount (distance) of a touch position between successive frames on the basis of position information about the touch position for each frame.

The communication unit 16 is a part that transmits drawing information stored in the storage unit to the external device.

Further, the communication unit 16 transmits latest information currently entered onto the marker board film by a handwriting input operation to the external device in real time.

The external device includes a storage medium, such as a USB memory or an external hard disk, and an information processing apparatus, such as a personal computer or a portable terminal, in addition to the above-described server, display device, and printer that are connected via the network.

For example, in a case where the user performs an input operation for executing a predetermined function or performs an input operation for turning the power off, the communication unit 16 attaches drawing information to an email and transmits the email to a destination indicated by a predetermined address. The communication unit 16 may transmit drawing information to the external device, namely, the display device, server, or printer, via the network. Further, the communication unit 16 may copy drawing information to an external medium, such as a USB memory.

The input coordinate correction unit 17 is a part that corrects obtained input coordinate data. Specifically, in a case where a line segment generated by concatenating a plurality of pieces of input coordinate data that are included in drawing information stored in the storage unit is a line segment having very small cyclic changes, the input coordinate correction unit 17 corrects the plurality of pieces of input coordinate data by using a predetermined approximate straight line.

In a case where a marker board is formed by stacking the marker board film 1 and the touch sensor 2, the distance between a contact surface on which the marker board film and an input pen are in contact with each other and the touch sensor is short, and therefore, depending on the touch location, the signal level of the obtained capacitance may vary to a large degree even on the same sensor line.

Further, a line drawn by the user with a marker pen is visually continuous analog information drawn in ink; however, input coordinate data obtained from, for example, an electronic whiteboard is discrete digital information. Therefore, in a case where a diagonal straight line is drawn with a marker pen, when the line drawn with the marker is compared with a line reproduced by concatenating pieces of input coordinate data that are actually obtained, the reproduced line might not be a smooth straight line and may appear to be a line segment having very small cyclic stepped irregularities.

Accordingly, as described below, in a case where obtained pieces of input coordinate data have cyclic irregularities, the pieces of input coordinate data can be corrected with a correction method described below by using a complementary function, such as a predetermined approximate straight line, so that the irregularities of the line segment are less conspicuous to the extent possible.

The storage unit 20 is a part that stores information input by handwriting and mainly stores drawing information input by handwriting on the basis of the obtained pieces of input coordinate data and the determined shape.

The drawing information is formed of input coordinate data 21 instantly obtained by the touch position detection unit, image data 22 generated by using the input coordinate data, etc. These pieces of data. may include attribute information (information for distinguishing a pen, a finger, an erroneous touch, an eraser, etc. from each other). The drawing information is instantly updated each time a handwriting input operation is performed.

Further, the storage unit 20 stores information and a program necessary for executing the functions of the handwriting input device. As the storage unit 20, a semiconductor storage element, such as a ROM, a RAM, or a flash memory, a storage device, such as an HDD or an SSD, or another storage medium is used.

The drawing information is information periodically updated and stored, and therefore, is stored in a rewritable RAM or HDD. In a case of saving a history of drawing information for a long period in accordance with a saving instruction operation performed by the user, the history is stored in a nonvolatile storage device or storage medium, such as an HDD.

Further, a constituent element other than those described above may be included.

For example, the above-described input unit has been described as a part for writing input; however, it is preferable to include an operation input unit for the user to give an instruction for saving drawing information, make a data transmission request, perform an operation for turning the power off, etc.

Further, as described below, a character recognition unit that extracts, by using drawing information stored in the storage unit, a part corresponding to a character in information that is input by writing, and recognizes the character input by writing may be included. Further, a constituent element that uses the result of recognizing the character to execute a keyword extraction function may be included, as described below.

Description of Drawing Information that is Saved

The content of drawing information that is saved is described below.

Figure 4:
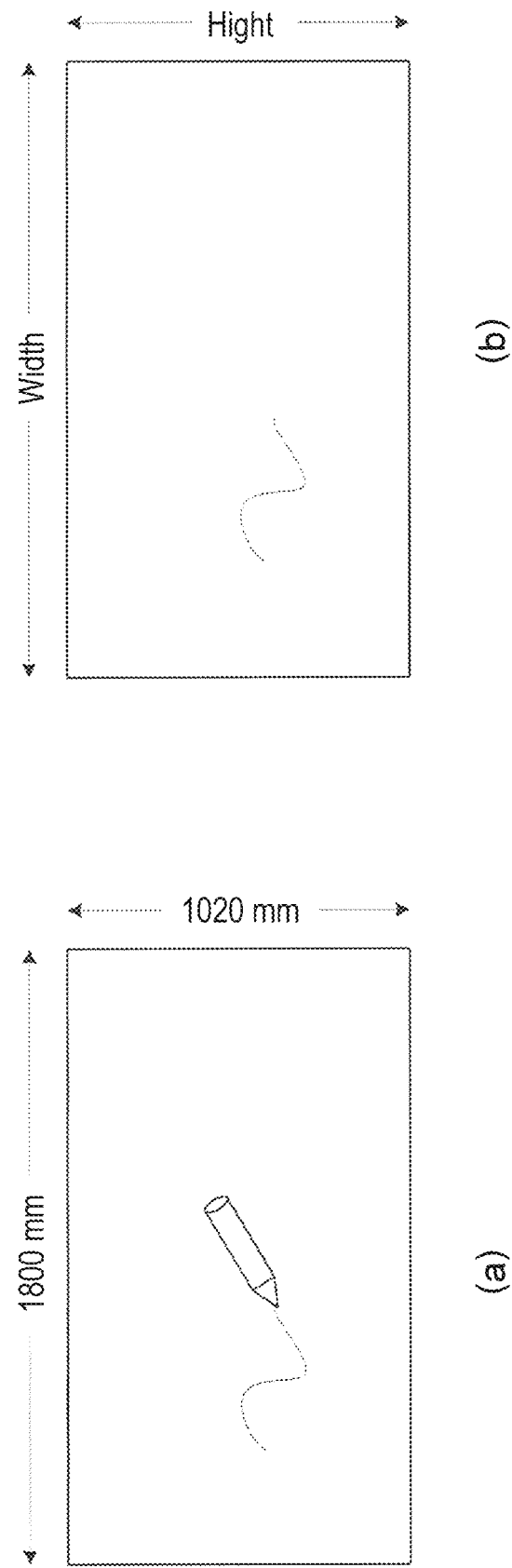
FIG. 4 includes diagrams illustrating an example of input by writing with a marker pen.

FIG. 4 includes diagrams illustrating an example of input by writing with a marker pen.

FIG. 4(*a*) illustrates a state where a line segment is drawn on the marker board film 1 with a marker pen.

FIG. 4(*b*) illustrates drawing information that is saved on the basis of a result obtained by the touch position detection unit 14.

In FIG. 4(*b*), the image data 22 instantly generated by using input coordinate data obtained from an input operation is saved successively. That is, data that is saved is the image data 22.

When it is assumed that the marker board film 1 is a marker board of a size equivalent to an 80-inch liquid crystal display size, the size of the drawing region is about 1800 mm in width (Y-axis direction) and about 1020 mm in height (X-axis direction), as illustrated in FIG. 4(*a*).

For example, when electrode lines are disposed at a sensor pitch of 7.65 mm, the sensor pitch being the distance between adjacent sensors, 235 sensor electrode lines are disposed in the long-side direction (Y-axis direction) and 133 sensor electrode lines are disposed in the short-side direction (X-axis direction).

In a case where the detection resolution of the touch sensor is an 8-bit (=256) resolution, a distance for which a one-bit difference can be determined is as follows:

7.65 mm (sensor pitch)÷256 (8-bit detection resolution)=0.03 mm, and position determination can be performed on the basis of this length.

That is, each time the position shifts by 0.03 mm, it is possible to obtain a capacitance specific to the position.

However, when all pieces of input coordinate data are saved with such a high detection precision, an excessively large storage capacity and a capability of quick processing are required. Therefore, it is actually preferable to perform saving while selecting an appropriate detection precision by taking into consideration the resolution of a display device that redisplays saved drawing information.

For example, in a case of redisplaying image data under the assumption that a saved drawing result is displayed on a full HD (1920 pixels×1080 pixels) display, the dot pitch (size of one pixel) of an 80-inch full HD display is 0.922 mm and the resolution thereof is 27.536 ppi, and this size is about 30 times the above-described resolution of 0.03 mm. Therefore, even if the precision in a case of saving image data is decreased and the image data is saved while the number of pixels is reduced to about one-thirtieth, degradation in display image quality in a case of redisplay is hardly observed.

However, in a case where image data saved with a full HD resolution as described above is redisplayed on a 4K UHD (3840 pixels×2160 pixels) display of the same size or an 8K UHD (7680 pixels×4320 pixels) display of the same size, image quality when the drawing content is redisplayed is degraded. This is because information about only every second pixel or every fourth pixel is saved. That is, in a case where there is an opportunity of redisplay on a display of a higher resolution, it is better to save image data as high-resolution data by taking into due consideration the resolution of the touch sensor so as not to cause image quality degradation in a case of redisplay.

This means the following. In an existing touch panel, when an image drawn on the touch panel is displayed and converted, and thereafter, the data is saved, the resolution for redisplay depends on the resolution of the display; however, the present invention allows a setting so as not to cause such a problem.

For example, to make degradation in display image quality be hardly observed, it is preferable to save image data for 15360 pixels×8640 pixels, which. is equivalent to an information amount twice that for 8K UHD for safety's sake.

Accordingly, drawing information of an eight-times data amount is saved for generally used full HD, and drawing information of a four-times data amount is saved for 4K UHD, and therefore, drawing information that is highly reusable can be saved.

The case of saving drawing information as image data has been described above. Alternatively, the input coordinate data 21 itself may be saved and reproduced as writing data as necessary.

FIG. 5 includes diagrams illustrating an example of input by writing with a marker pen as in FIG. 4.

FIG. 5(*a*) illustrates a state where a line segment is drawn on the marker board film 1 with a marker pen as in FIG. 4(*a*).

FIG. 5(*b*) illustrates drawing information that is saved on the basis of a result obtained by the touch position detection unit 14.

This figure illustrates a case where, as drawing information, the input coordinate data 21 of the line segment input by writing is saved. Specifically, data based on a sensor coordinate system in which the position of the X sensor and that of the Y sensor are set on axes orthogonal to each other is saved.

Further, as drawing information, attribute information may be additionally stored in addition to the input coordinate data 21.

The attribute information is information with which a touch state is distinguishable. As the attribute information, for example, a touch ID for distinguishing a touch position, touch-in information indicating the start of the touch, touch-out information indicating the end of the touch, etc. may be stored. Accordingly, drawing data as illustrated in FIG. 4(*b*) can be reproduced as necessary from the saved drawing information, and therefore, the drawing information can be saved as highly reusable information.

Figure 6:
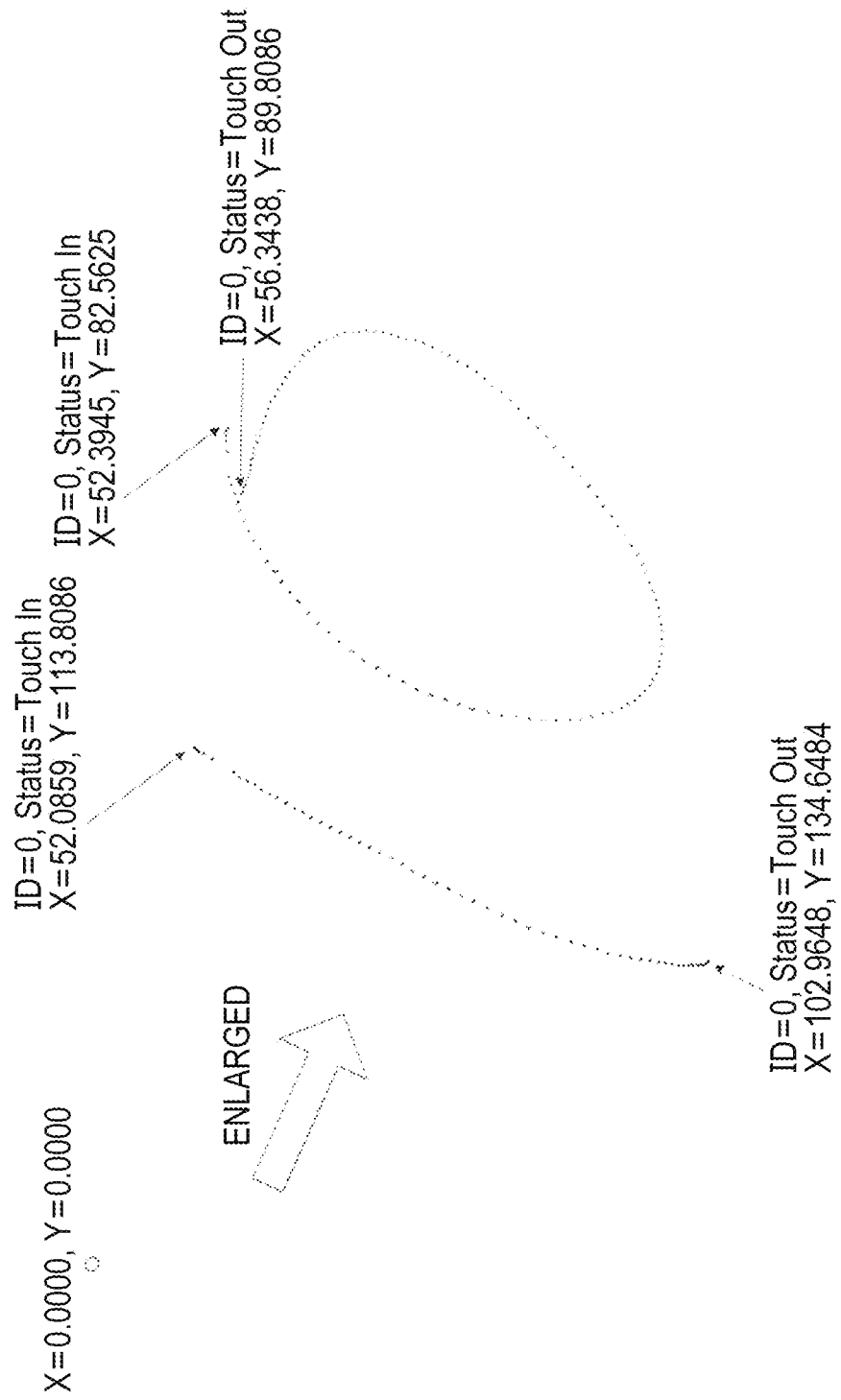
FIG. 6 is a diagram illustrating plotting of output coordinate data of characters drawn by continuous operations.

FIG. 6 is a diagram illustrating plotting of input coordinate data in a case of actually inputting the characters "10".

Here, when touch-in attribute information and touch-out attribute information are retained together with coordinate information, the drawing result can be reproduced by concatenating pieces of coordinate data on the basis of the pieces of attribute information in response to a redisplay request from the user.

In FIG. 6, a touch ID=0 indicating that both "1" and "0" are results of drawing by one operator is recorded.

In a case of multi-touch in which two operators simultaneously draw, different touch IDs are assigned to respective pieces of drawing information to distinguish the touch positions from each other, so that the pieces of drawing information can be separated from each other.

The attribute information is not limited to the information described above and, for example, information about the color or thickness (pen pressure) of the pen, etc. may be used as the attribute information.

Description of Easing Drawing Information

Figure 7:
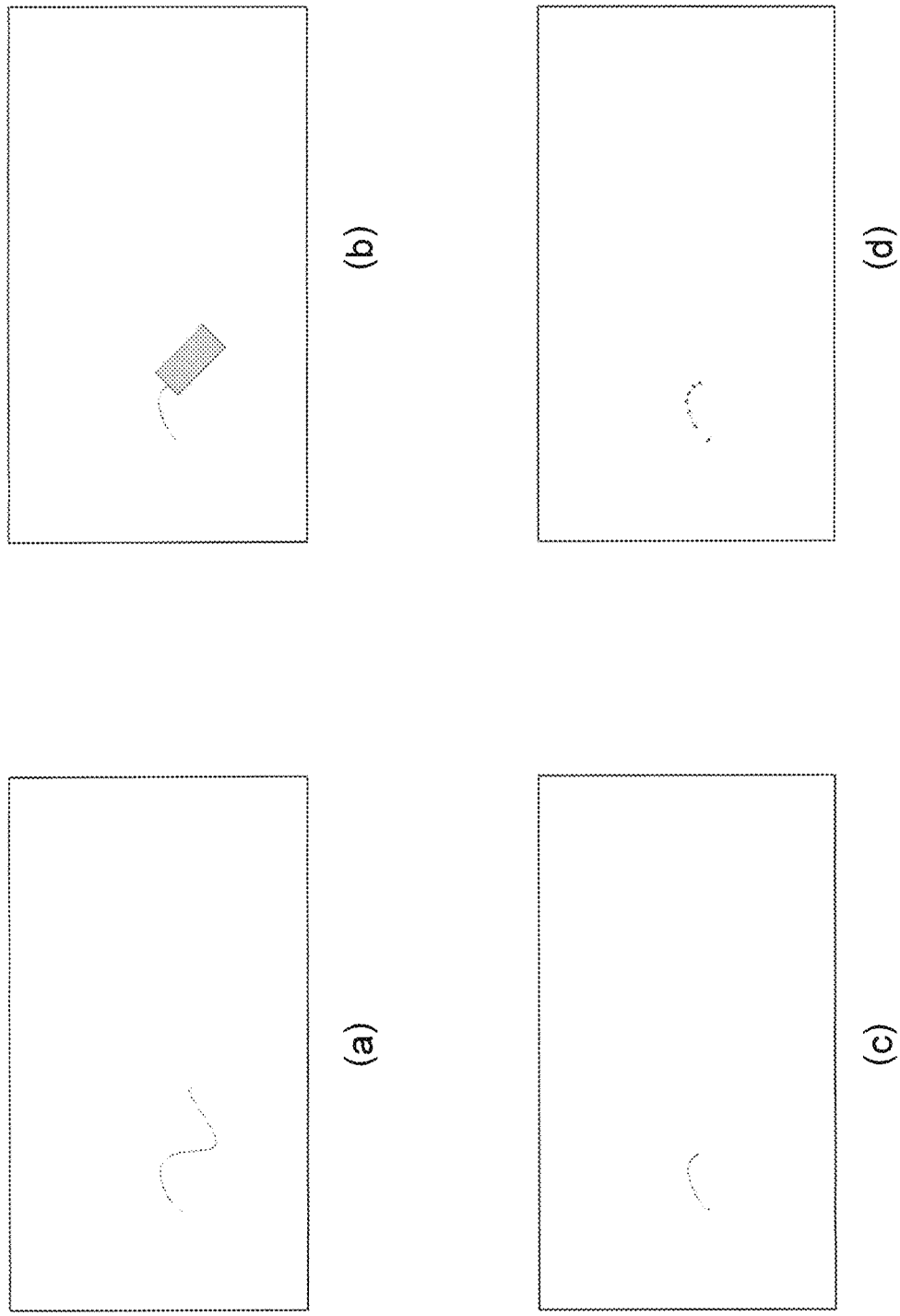
FIG. 7 includes diagrams illustrating a process for erasing a line segment input by writing.

FIG. 7 includes diagrams illustrating a process for erasing a line segment input by writing.

FIG. 7(*a*) illustrates an example result of drawing a line segment input by writing with a marker pen.

As illustrated in FIG. 7(*b*), an erasing member (eraser) is used to trace over a part of the line segment input by writing with a marker pen to erase the part.

FIG. 7(*c*) illustrates the result of erasing, with the erasing member (eraser), the part of the line segment input by writing.

FIG. 7(*d*) illustrates drawing information (input coordinate data) that is saved after the part of the line segment input by writing has been erased. As a result of the erase operation with the erasing member (eraser), in the stored drawing information, input coordinate data that corresponds to the part of the line segment for which the erase operation has been performed is instantly erased.

The erasing member (eraser) is a capacitive implement that includes a material, such as felt, with which the ink on the line segment input by wiring with a marker pen can be erased.

FIG. 8 includes example configurations of an erasing member (eraser).

As illustrated in FIG. 8(a), an erasing member (eraser) 51 is constituted mainly by a conductive member 52 for determining an eraser on the basis of a capacitance change and a felt member 54 for erasing (wiping off) the ink of a marker pen applied to the marker board film.

The bottom surface on which the felt member 54 is formed is a surface that is in contact with the marker board film 1.

The conductive member 52 is a member that has a size equal to or larger than a predetermined area relatively larger than a marker pen, etc. and that is formed of a material with which the capacitance change sensing unit detects a capacitance change.

For example, in a case where the user holds the erasing member 51 and performs an operation of erasing, with the erasing member, writing information already entered onto the marker board film, writing information already entered onto the to a part for which the erase operation has been performed is erased with the felt member. Further, in accordance with the result of the erase operation, in the drawing information stored in the storage unit, the drawing information that corresponds to the writing information corresponding to the part for which the erase operation has been performed is erased.

The erasing member 51 illustrated in FIG. 8(a) includes the conductive member 52 formed therein and having a relatively large area. Therefore, in a case where a touch of a relatively large area and movement of the touch input position for a predetermined amount or more are detected, the touching object is recognized as the erasing member 51, and the corresponding region in the drawing information is erased. That is, in the input coordinate data stored in the storage unit 20, information about the part that is touched with the eraser 51 is erased from the storage unit 20.

Further, the line segment input by writing on the front surface of the marker board film 1 is actually erased by a user's intended erase operation, and therefore, visual information viewed by the user matches the drawing information stored in the storage unit 20 after the erase operation.

FIG. 8(b) and FIG. 8(c) illustrate another example configuration of the erasing member (eraser) 51.

FIG. 8(b) is a side view and illustrates a nonconductive member 53 provided in an intermediate part between the erasing member 51 and the felt member 54 and five conductive members 52 disposed in the intermediate part in which the nonconductive member 53 is formed. FIG. 8(c) is a diagram of the erasing member 51 in FIG. 8(b) viewed from the top surface side on which the conductive member 52 is formed, and illustrates the disposition of the five conductive members 52 in the intermediate part.

In the case of FIG. 8(b), when touches of a plurality of conductive members 52 disposed at positions apart from each other by a predetermined distance are detected, the touching object is recognized as an eraser. For example, in a case where a touch is detected at five positions or three positions that are apart from each other by a predetermined distance, the touching object is recognized as the eraser 51, and the corresponding region in the drawing information is erased.

Also in this case, in the stored input coordinate data, information about the part that is touched with the eraser is erased from the storage unit 20, and the line segment input by writing on the front surface of the marker board film 1 is actually erased by a user's intended erase operation, and therefore, visual information viewed by the user matches the drawing information stored in the storage unit 20 after the erase operation.

Description of Shape Determination Process

In a case where an input operation is a pen input operation, input coordinate data is added. In a case where an input operation is an erase input operation, input coordinate data is deleted. Determination of an input operation for determining whether input coordinate data is to be added or deleted is described below.

FIG. 9 includes diagrams schematically illustrating an example of a shape determination process performed by the shape determination unit 13.

FIG. 9(a) is a picture showing a line segment that is input by writing on the front surface of the marker board film 1 with a marker pen 50.

FIG. 9(b) is a picture showing the input written line segment that is erased with the eraser 51 on the front surface of the marker board film 1.

FIG. 9(c) is a diagram illustrating an example change in the magnitude of the capacitance in a case of inputting a line segment by writing with the marker pen 50.

FIG. 9(d) is a diagram illustrating an example change in the magnitude of the capacitance in a case of erasing an input written line segment with the eraser 51.

As illustrated in FIG. 9(c), in general, in a case of a touch of an object having a small contact surface, such as the marker pen 50, the change C1 in the magnitude of the capacitance tends to be small, and the width W1 of the crest of the capacitance change tends to be narrow. On the other hand, as illustrated in FIG. 9(d), in a case of a touch of an object having a large contact surface, such as the eraser 51, a larger number of sensors respond, and therefore, the change C2 in the magnitude of the capacitance tends to be large, and the width W2 of the crest of the capacitance change tends to be wide.

Also in a case of a touch of, for example, a finger, the back of a hand, the palm of a hand, etc. other than the eraser 51, the magnitude of the capacitance changes as in FIG. 8(d).

Accordingly, thresholds are set for changes in the capacitance, and the magnitude of an actually detected capacitance change is compared with the thresholds to thereby determine the shape of the touching object.

For example, a threshold SK1 (first threshold) in a case of a touch of an object having a small contact surface, such as the marker pen 50, is set in advance, as illustrated in FIG. 9(c), and a threshold SK2 (second threshold) in a case of a touch of an object having a large contact surface, such as the eraser 51, is set in advance, as illustrated in FIG. 9(d), where SK1<SK2 is satisfied.

In the case of FIG. 9, in a case where the magnitude of an actually sensed capacitance change is larger than the predetermined first threshold SK1 and smaller than the predetermined second threshold SK2, the shape determination unit 13 determines that the touching object is the marker pen 50. That is, the touch operation is determined to be an input operation by writing with the marker pen.

Further, in a case where the magnitude of an actually sensed capacitance change is larger than the second threshold SK2, the shape determination unit 13 determines that the touching object is an object other than the marker pen 50. That is, the touch operation is determined to be an operation other than an input operation by writing.

Accordingly, input by writing with the marker pen 50 can be distinguished from the other input.

In a case where a touch is determined to be the other input, the following capacitance changes that are caused mainly by two types of touches described below can be present:

A) a capacitance change caused by a touch of a finger or an erroneous touch not intended for drawing; and B) a capacitance change caused by a touch for the purpose of erasing with an eraser.

The two types of touches can be distinguished from each other as follows, for example.

First, regarding the touch that is determined to correspond to B), in a case where a touch for which the capacitance change equal to or larger than the second threshold SK2 is concentrated within a predetermined distance at the time of touch-in, the touch is determined to be a touch of an eraser. That is, in a case where a sensed capacitance change is a change having a magnitude that is equal to or larger than the predetermined second threshold within a predetermined distance on the marker board film, the touch is assumed to be a single operation, and the touching object is determined to be an erasing member. That is, the touch operation is determined to be an erase operation with an erasing member.

Also in a case where the touch input position moves over a predetermined amount of distance or more over a plurality of frame periods or within a predetermined period, the touch is determined to be a touch of an eraser.

The touch that is determined to correspond to A) is a touch other than the touch that is determined to correspond to B). For example, a case where the touch input position moves over a distance shorter than the above-described predetermined amount of distance within a predetermined period corresponds to A), and it is determined that an operation not intended for drawing, such as an operation with a finger or an erroneous touch, has been performed.

With the above-described determination, it is possible to distinguish an erase operation with an eraser from an operation with a finger, etc. not intended for drawing.

In addition to the above, a touching object can be distinguished on the basis of a relationship between the obtained capacitance magnitude (capacitance signal value) and the area in which a capacitance change is detected.

Figure 10:
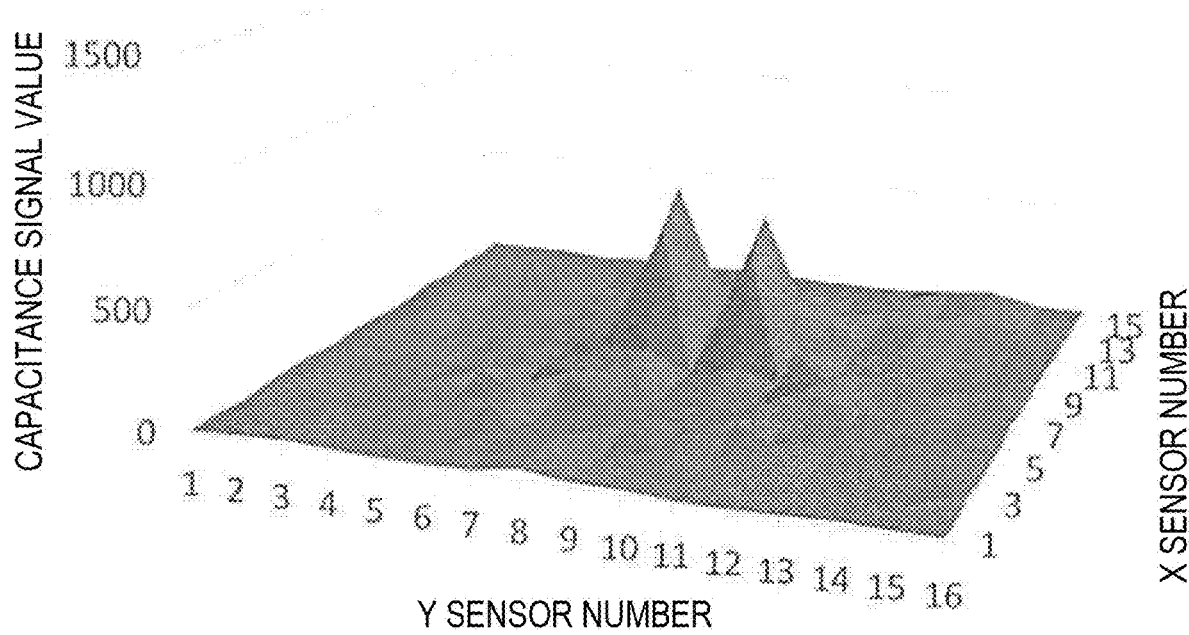
FIG. 10 is an example graph of the magnitude of a capacitance (capacitance signal value) in a case of pen input.
Figure 11:
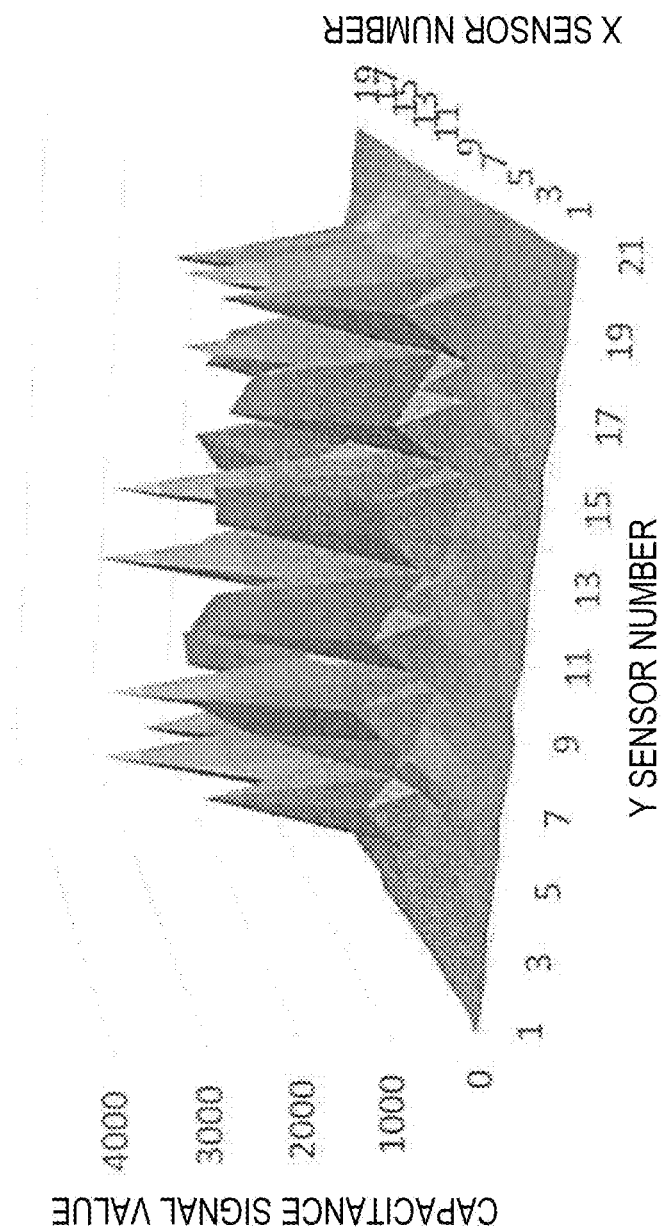
FIG. 11 is an example graph of the magnitude of a capacitance (capacitance signal value) in a case of eraser input.

FIG. 10 and FIG. 11 are example graphs illustrating the magnitude of the capacitance (capacitance signal value) at each position at which the two capacitive sensors (X sensor and Y sensor) cross each other. A position at which the capacitance signal value changes is a position at which a touch is detected.

FIG. 10 is an example graph of the capacitance signal value in a case of a touch of the marker pen 50, and FIG. 11 is an example graph of the capacitance signal value in a case of a touch of the eraser 51.

In the case of a touch of the marker pen 50, the magnitude of the signal is relatively small, and the width of the crest is approximately equal to a width for two to three sensors, as illustrated in FIG. 10. That is, the magnitude of the signal is small, and the touch area is small.

On the other hand, in the case of a touch of the eraser 51, the magnitude of the signal is relatively large, and the width of the crest is equal to a width for ten sensors or more, as illustrated in FIG. 11. That is, the magnitude of the signal is large, and also the touch area is large.

Figure 12:
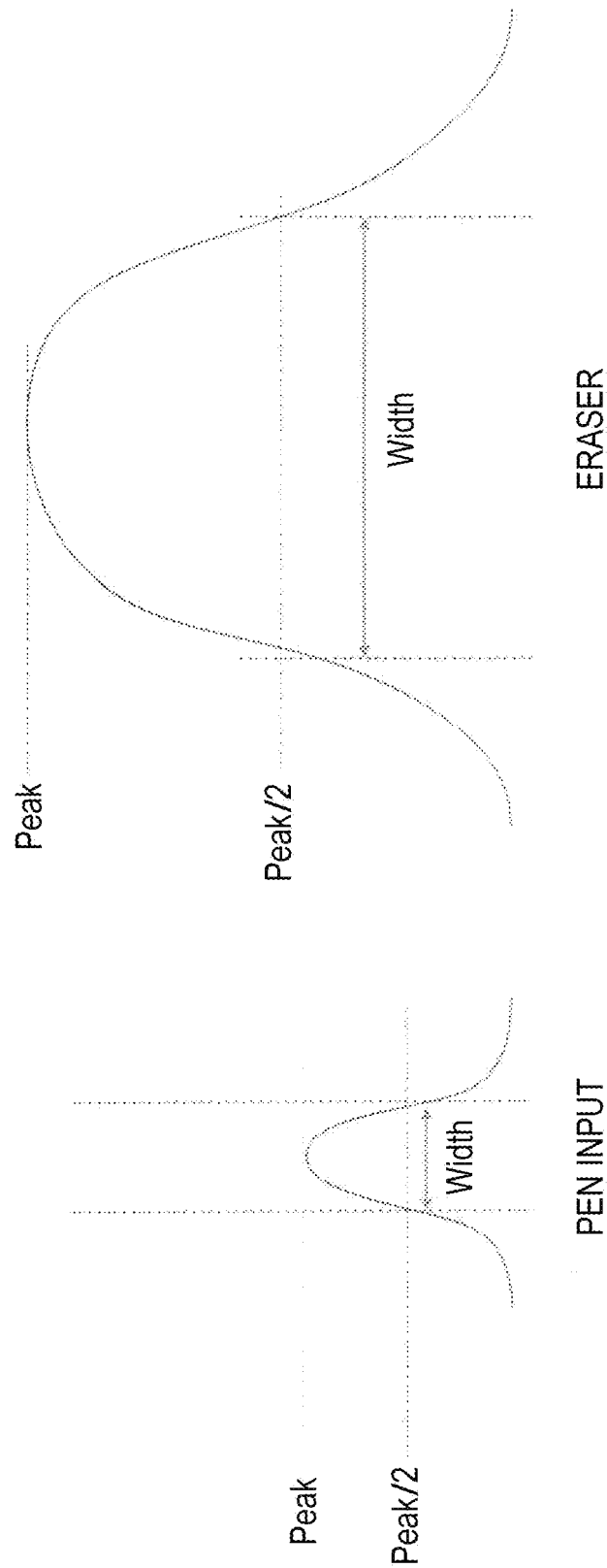
FIG. 12 includes example graphs illustrating determination of capacitance signal values based on a half-width.

FIG. 12 includes example graphs illustrating the capacitance signal value.

FIG. 12(a) is an example graph illustrating a change in the capacitance signal value caused by the marker pen 50.

FIG. 12(b) is an example graph illustrating a change in the capacitance signal value caused by the eraser 51.

As illustrated in FIG. 12(a), in a case where the touch area is small, the width of the crest of the peak value Peak of the change in the capacitance signal value is small, and as illustrated in FIG. 12(b), in a case where the touch area is large, the width of the crest of the peak value Peak of the change in the capacitance signal value is large.

Accordingly, the height of the peak value Peak of the capacitance change and the width Width for the sensors corresponding to the half (Peak/2) of the peak value Peak (that is, the half-width) need to be used to determine whether the touch is a touch of the marker pen 50 or a touch of the eraser 51.

Note that, in a case where the change in the obtained capacitance signal value has a shape significantly different from the shapes illustrated in FIG. 12, it is necessary to determine the touch to be ambiguous, to ignore the touch, and not to process the touch as a drawing operation with the marker pen 50 or an erase operation with the eraser 51.

Description of Storing Process at the Time of Input by Writing

Figure 13:
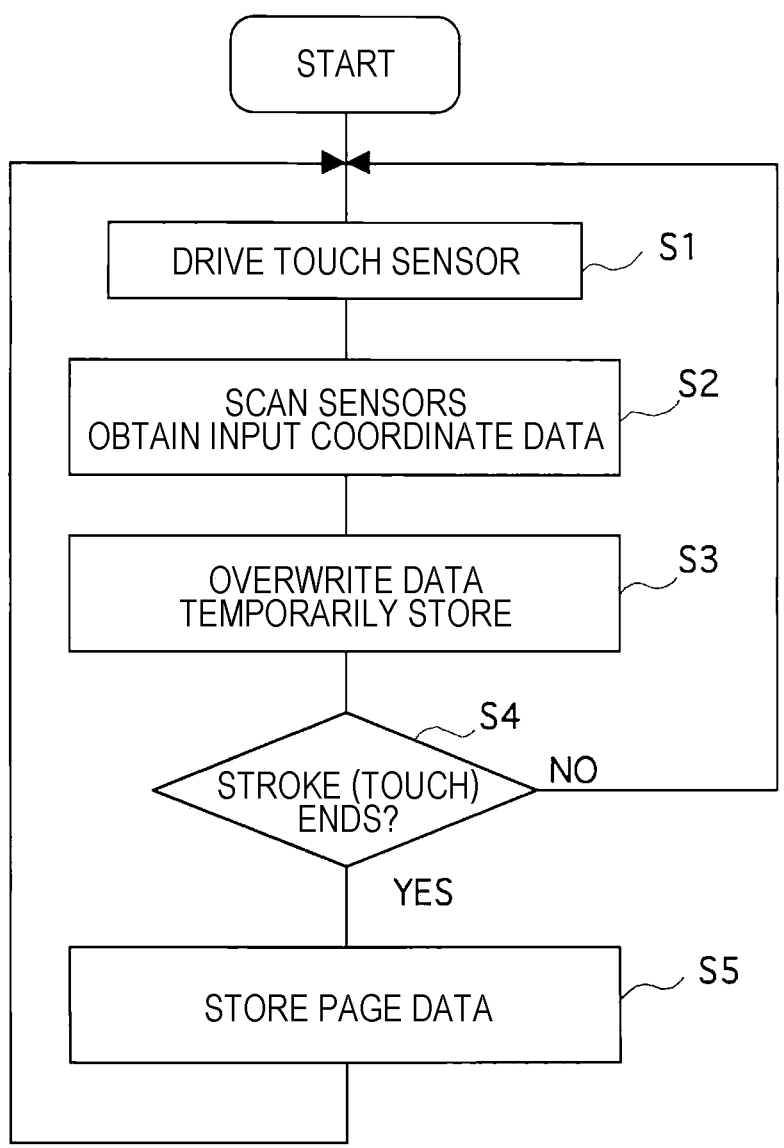
FIG. 13 is a flowchart of an example of a storing process at the time of input by writing in the writing input device.

FIG. 13 is a flowchart illustrating an example of a storing process in which input coordinate data is generated and stored at the time of input by writing in the writing input device.

First, in step S1, the sensor driving unit 11 drives the touch sensor 2. That is, the sensor driving unit 11 sequentially scans the lines of the X sensor and the Y sensor, applies a predetermined voltage to the lines, and obtains capacitances.

In step S2, the sensors are scanned as described above, and input coordinate data of a position at which a touch is detected on the basis of a capacitance change is obtained.

In step S3, the sensors are scanned as described above, and capacitance data of the entire marker board film is temporarily stored.

Accordingly, data stored for a position at which a touch has been detected is overwritten, and updated and stored in the storage unit 20. That is, information stored for a position corresponding to the obtained input coordinate data is overwritten with the currently obtained input coordinate data.

Any of the process in step S2 and the process in step S3 may be performed first, and both the processes are performed instantly.

A scan of the sensors is repeated at predetermined intervals, and the presence of the touch detected on the basis of a capacitance change is checked in step S4. Here, the time taken for each predetermined interval is equivalent to the time taken to scan the entire surface of the marker board film once.

In a case where the touch detected on the basis of a capacitance change continues, the flow returns to Step S1. In a case where the touch detected on the basis of a capacitance change ends, the flow proceeds to step S5.

In step S5, image data for one stroke has been obtained, and therefore, the obtained drawing information is stored as one piece of page data.

Thereafter, the flow returns to step S1, and the process described above is repeatedly performed.

Now, a process for saving, in the storage unit 20 as a history, information about a line segment, etc. input by writing is described.

Figure 14:
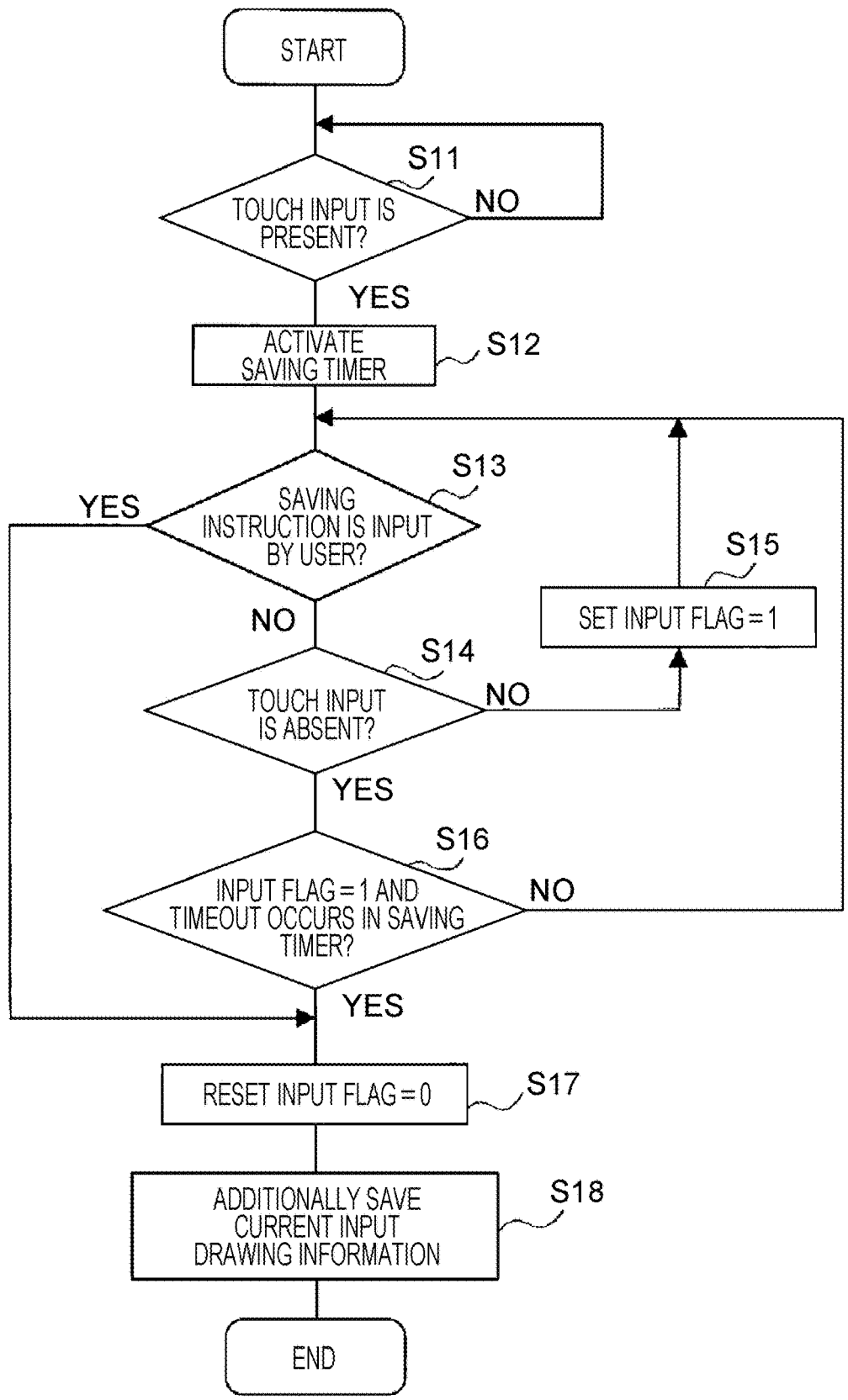
FIG. 14 is a flowchart of an example process for saving temporarily stored input coordinate data, etc. as a history.

FIG. 14 is a flowchart illustrating an example process for saving, as a history, temporarily stored input coordinate data, etc. which has been described with reference to FIG. 13.

In the saving method, there may be a case where the saving process is performed in accordance with a saving instruction intentionally input by the user and a case where the instruction is not input and the saving process is automatically performed after a predetermined time has passed since touch input was lost. FIG. 14 illustrates a flow that includes the saving process in both the cases.

In step S11 in FIG. 14, the touch position detection unit 14 checks if touch input is present.

If touch input is not present, step S11 is repeated. If touch input is present, the flow proceeds to step S12. In step S12, a saving timer is activated. The time measured by the saving timer may be any time and may be set in advance to 10 minutes. Alternatively, the user may be allowed to set the time that is measured by the saving timer.

In step S13, it is checked if a saving instruction is input by the user.

In a case where a saving instruction is input, the flow proceeds to step S17. If a saving instruction is not input, the flow proceeds to step S14.

In step S14, the touch position detection unit 14 checks if touch input is currently present.

If touch input is not present, the flow proceeds to step S16. If touch input is present, the flow proceeds to step S15.

In step S15, an input flag indicating the presence or absence of touch input is set to 1, which indicates the presence of touch input. Thereafter, the flow returns to step S13.

It is assumed that a case where the input flag is equal to 1 means that touch input is present and the image has been changed and that a case where the input flag is equal to 0 means that touch input is not present and the image has not been changed.

In step S16, it is checked if the input flag is equal to 1 and a timeout occurs in the saving timer.

In a case where the input flag is equal to 1 and a timeout occurs in the saving timer, the flow proceeds to step S17. Otherwise, the flow returns to step S13.

In step S17, the input flag is reset to 0.

In step S18, drawing information including temporarily stored current input coordinate data is additionally saved in the storage unit 20 as a history.

With the process described above, drawing information input by writing can be saved at a timing as intended by the user or after a predetermined interval has passed since touch input was lost.

Description of Process for Determining Object Used in Writing Input

Now, a description is given of a process for determining the marker pen 50, the eraser 51, and an erroneous touch, which is touch input not intended by the user, as described above.

This determination process is a process performed mainly by the shape determination unit 13.

Figure 15:
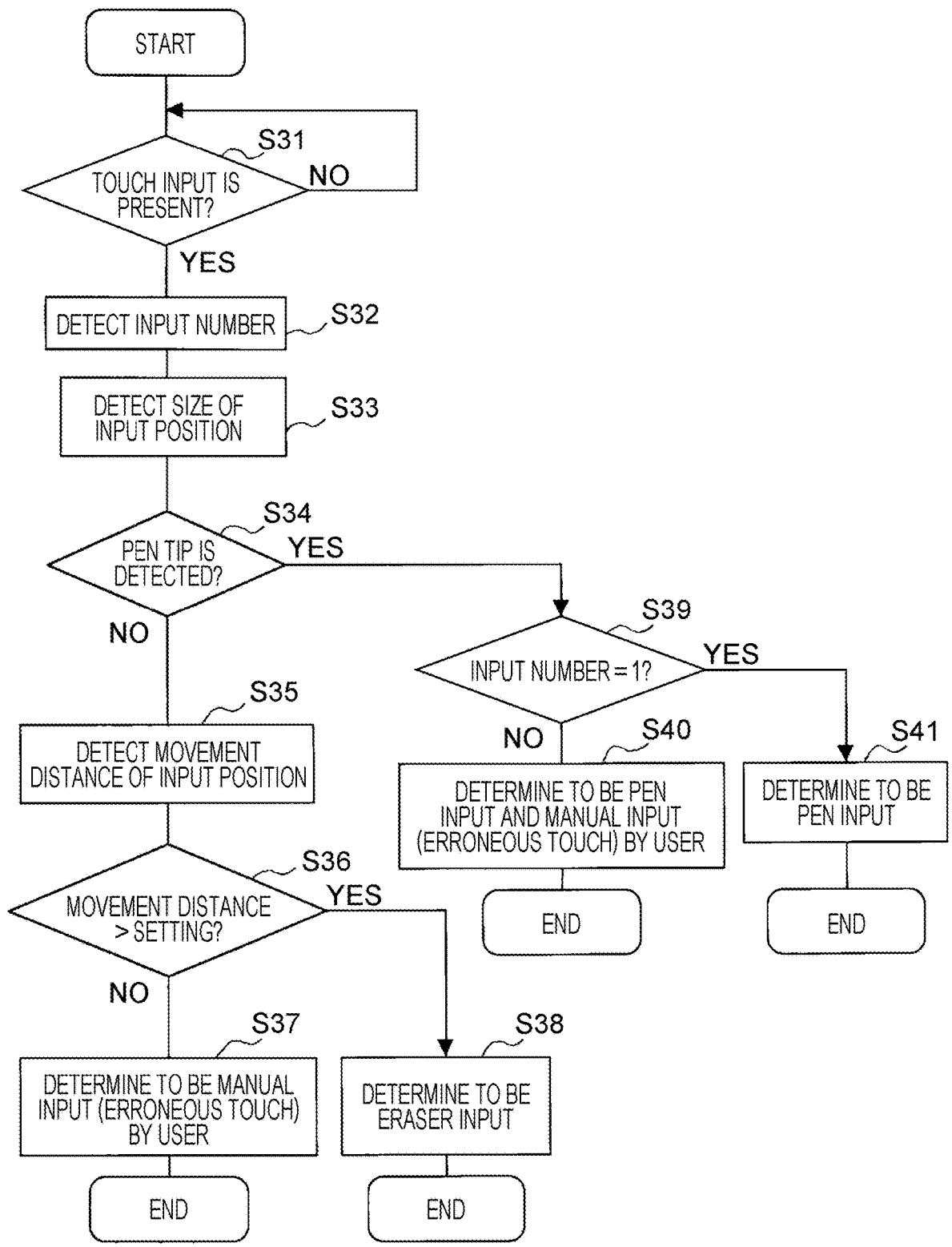
FIG. 15 is a flowchart of an example of a determination process for determining an input mode.

FIG. 15 is a flowchart illustrating an example of the determination process for determining an object that touches the marker board. In step S31 in FIG. 15, the touch position detection unit 14 checks if touch input is present.

If touch input is not present, step S31 is repeated. If touch input is present, the flow process to step S32.

In step S32, an input number is detected.

The input number is detected in order to determine whether an input operation by a single user is performed or input operations by a plurality of users are performed. In a case of an input operation by one user at a plurality of points, the distance between the touch points is determined in order to determine, for example, whether user's manual input (erroneous touch) is present simultaneously with input by writing with a pen.

An input number of two or more may be detected by determining whether touch input is present at two or more positions apart from each other by 10 cm or more.

The case where the input number is equal to 1 means that touch input is performed by one user at one position, and the case where the input number is equal to 2 means that, for example, touch input is performed by a plurality of users at two positions.

In step S33, the size of the position at which touch input is performed is detected. The size of the position at which touch input is performed can be detected by, for example, calculating the area of the touch position from the obtained capacitance data.

In step 134, it is checked if a pen tip is detected at the touch position from the detected size of the position at which touch input is performed. For example, in a case where the size of the position at which touch input is performed is smaller than a predetermined size, it is determined that a pen tip is detected.

In a case where it is determined that the touch input is detected as touch input with a pen tip, the flow proceeds to step 139. Otherwise, it is determined that the touch input is a process other than drawing with a pen tip, and the flow proceeds to step S35.

In step S35, the movement amount obtaining unit 15 detects the movement distance of the input position.

In step S36, it is determined whether the movement distance of the input position within a predetermined period is equal to or shorter than a predetermined distance setting.

For example, if the movement distance is equal to or shorter than the predetermined distance setting, the touch is determined to be an erroneous touch, and if the movement distance is longer than the predetermined distance setting, the touch is determined to be a touch for the purpose of an erase process.

Here, a case is assumed where a character measuring about 30 mm by 30 mm is erased on an 80-inch display.

To determine whether image data is to be updated and saved, it is determined whether the movement distance of the input position per second is 30 mm or less. That is, the predetermined distance setting is set to 30 mm.

In this case, if the frame rate is 240 Hz, 240 pieces of drawing information are obtained per second. If the movement distance of the input position is 30 mm or less in all frames, it is determined that the input position remains stationary. That is, the touch is determined to be an erroneous touch.

On the other hand, if the movement distance of the input position is more than 30 mm in all frames, the touch is determined to be a touch of the eraser 51.

Alternatively, the movement distance per second obtained from the input coordinate data from the touch sensor may be determined while using the sensor pitch as the unit.

When the sensor pitch, which is the distance between adjacent sensors, is assumed to be 7.65 mm, the movement distance of, for example, 30 mm is expressed by the following expression.

$$30 \text{ mm} \div 7.65 \text{ mm} \approx 4$$

That is, the movement distance is assumed to be a distance for four sensors, and the distance for four sensors may be assumed to be a predetermined value and used as a criterion for determination.

Also in this case, if the movement distance is equal to or shorter than the distance for four sensors in all frames, it is determined that the input position remains stationary, that is, the touch is determined to be an erroneous touch. If the movement distance is longer than the distance for four sensors, the touch is determined to be a touch of the eraser 51.

In step S36, in a case where the movement distance of the input position exceeds the predetermined distance setting, the flow proceeds to step S38. Otherwise, the flow proceeds to step S37.

In step S37, the movement distance of the input position is equal to or shorter than the predetermined distance setting, and therefore, the touch is determined to be manual input (erroneous touch) by the user, as described above.

In step S38, the movement distance of the input position exceeds the predetermined distance setting, and therefore, the touch is determined to be a touch of the eraser 51.

In a case where it is determined in step S34 that a pen tip is detected, that is, in a case where the touch input is determined to be a drawing operation, the flow proceeds to step S39, and it is checked if the detected input number is equal to 1.

In a case where the input number is equal to 1, the flow proceeds to step S41. Otherwise, the flow proceeds to step S40.

In step S41, the touch input is determined to be a touch of the marker pen 50.

In step S40, touch input is detected at two or more positions, and therefore, the touch input is determined to include both pen input and manual input (erroneous touch) by the user, and only the pen input is assumed to be valid input.

With the determination process described above, an object used in touch input is identified, and a process corresponding to the identified object is performed. In a case where the identified object is the marker pen 50, drawing information is stored. In a case where the identified object is the eraser 51, drawing information is erased.

Description of Process for Transmitting Saved Drawing Information

Now, a process for transmitting drawing information saved in the storage unit by email or to a set data destination is described.

As described above, drawing information is saved in the storage unit 20 as one piece of page data in accordance with, for example, a saving instruction input by the user.

Figure 16:
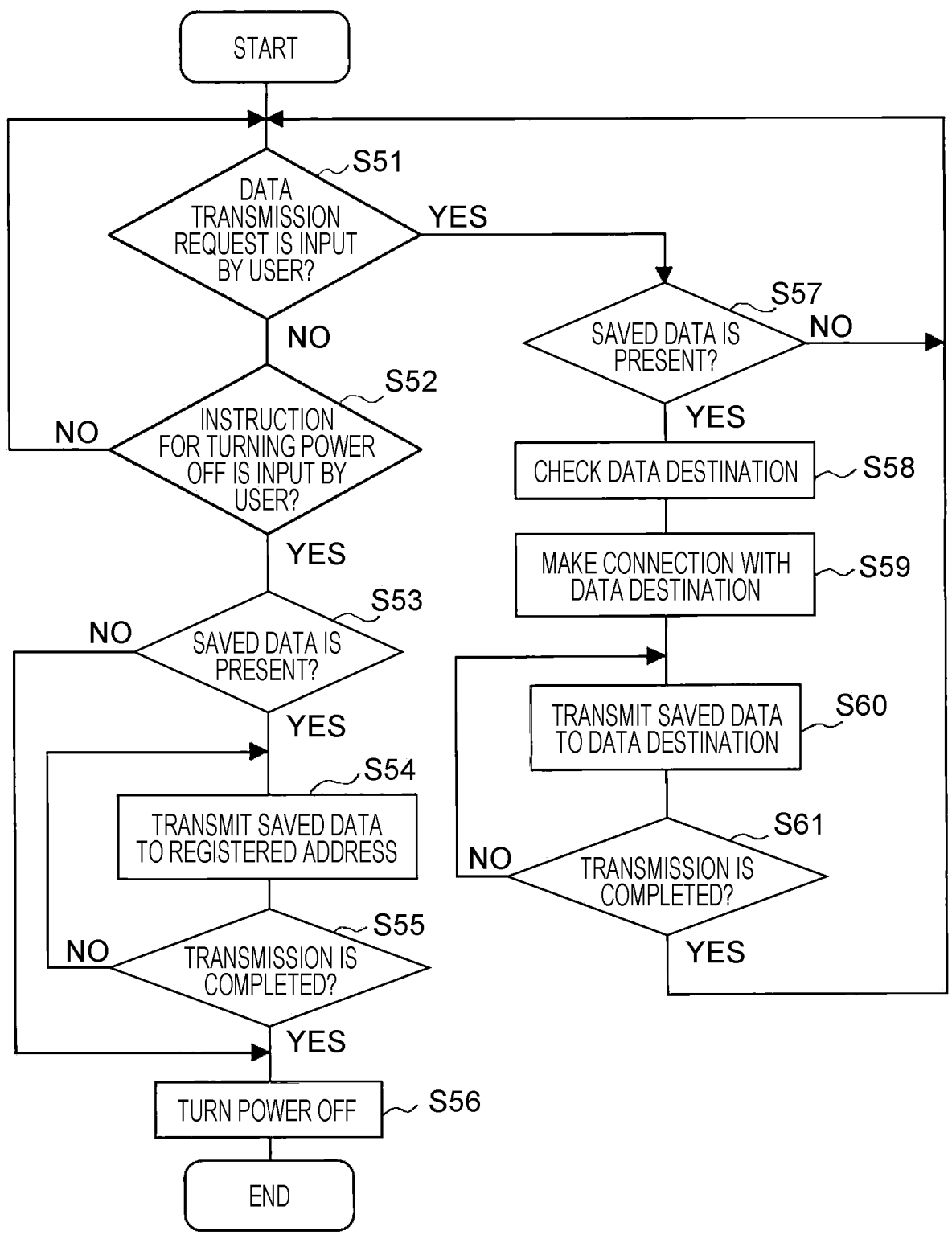
FIG. 16 is a flowchart of an example process for transmitting saved drawing information to a predetermined destination.

FIG. 16 is a flowchart illustrating an example process for transmitting saved drawing information to a predetermined destination.

This flowchart illustrates a case where drawing information is transmitted in response to a data transmission request input by the user and a case where drawing information is transmitted in response to an instruction for turning the power off input by the user. However, instructions input by the user are not limited to these and may be other instruction input. Alternatively, drawing information may be periodically transmitted without an instruction input by the user.

In step S51, it is checked if a data transmission request is input by the user.

In a case where a data transmission request is input by the user, the flow proceeds to step S57. Otherwise, the flow proceeds to step S52.

In step S52, it is checked if an instruction for turning the power off is input by the user.

If an instruction for turning the power off is input by the user, the flow proceeds to step S53. Otherwise, the flow returns to step S51.

In step S53, it is checked if saved drawing information (saved data) is present.

In a case where saved drawing information is present, the flow proceeds to step S54. Otherwise, the flow proceeds to step S56.

In step S54, the drawing information (saved data) is transmitted to a registered address.

In a case where an email address is registered as the registered address, the drawing information is attached to a predetermined email and transmitted.

In step S55, it is checked if the drawing information is successfully transmitted. For example, it is checked if an email for receipt acknowledgment is returned from the destination.

In a case where transmission of the drawing information is successfully completed, the flow proceeds to step S56. Otherwise, the flow returns to step S54 and retransmission is performed. In a case where transmission is not successfully completed even after retransmission has been repeated several times, the flow proceeds to step S56.

In step S56, the power of the device is turned off, and the process ends.

In step S57, it is checked if saved drawing information (saved data) is present as in step S53.

In a case where saved drawing information is present, the flow proceeds to step S58. Otherwise, the flow returns to step S51.

In step S58, the data destination is checked. For example, in a case where the data destination is stored in advance in the storage unit, the stored data destination is read. Alternatively, display for asking the user about the data destination may be performed to prompt the user to select or input the data destination.

In step S59, a connection with the data destination is made. For example, a connection with a server or a large-sized display device installed in another building, etc. may be made via a network.

In step S60, the drawing information (saved data) is transmitted to the connected data destination.

In step S61, it is checked if the drawing information is successfully transmitted as in step S55.

In a case where transmission of the drawing information is successfully completed, the flow returns to step S51. In a case where transmission of the drawing information is not successfully completed, the flow returns to step S60, and retransmission is performed.

Further, an instruction for turning the power off may be replaced with, for example, a print instruction input by the user so that the drawing information can be transmitted to a printer and the drawing information can be printed on a sheet.

In a case of transmitting drawing information to a display or a projector for a videoconference system installed in a remote place, information already saved is not transmitted but drawing information that is currently being input by writing and that is temporarily stored is transmitted in real time.

Accordingly, the drawing information currently being input by writing can be shared between two or more meeting rooms, and the same information input by writing can be provided to a person who is present at a site where writing input is performed and to a person who views the display of the videoconference system installed in the remote place, so that the conference can smoothly proceed.

Description of Character Recognition and Keyword Extraction

Information about characters drawn by the user can be stored for each stroke. Therefore, in addition to the functions described above, a function of character recognition may be added in order to increase the reusability of drawing information input by writing.

Character parts are extracted from drawing information saved after drawing by the user, and characters are recognized and stored as text information. When the characters are recognized, a clean copy of written minutes, etc. drawn by the user on the marker board film can be made and retained.

Further, a function of extracting a keyword specified by the user from the result of character recognition may be added. When the keyword is extracted, minutes, etc. can be classified is accordance with the extracted keyword and filed. Also in this case, the reusability of drawing information can be increased.

The character recognition process for drawing information needs to be performed by using an existing technique.

For example, mainly a labeling process, a bounding rectangle process, an integration process, and a character extraction process need to be performed in this order to perform character recognition.

The labeling process is a process for extracting specific regions by assigning input coordinate data with labels (numbers) as attributes.

The bounding rectangle process is a process for calculating the maximum and minimum coordinates from label information obtained in the labeling process and obtaining bounding rectangles corresponding to the label information.

The integration process is a process for setting, among the bounding rectangles that are obtained as a result of integration in the bounding rectangle process, a rectangle having an aspect ratio of about 1.5 as a candidate character region. A bounding rectangle that has an aspect ratio of 1.5 or more may be set as a candidate character part.

The character extraction process is, for example, a process for merging rectangles that overlap as a result of the integration process into one rectangle or integrating candidate character regions within a predetermined number of pixels (for example, 10 pixels) or candidate character parts. After the processes described above have been performed, a candidate character part not integrated with others is cancelled so that an object, such as a straight line, other than characters can be removed.

Description of Correction of Coordinate Data

As described above, in a case where a marker board is formed by stacking the marker board film 1 and the touch sensor 2, the distance between a contact surface on which the marker board film and an input pen are in contact with each other and the touch sensor is short, and therefore, it is preferable that the input coordinate correction unit 17 correct the obtained input coordinate data.

Specifically, in a case where the touch sensor has a mesh structure as illustrated in FIG. 17, depending on the pointed part of the same sensor line, the capacitance value tends to fluctuate. Further, this effect is more significant as the distance between the contact surface of the marker board film 1 and the touch sensor 2 is shorter.

For example, in a case of using the marker pen 50, the difference in the signal level of the obtained capacitance is approximately doubled depending on the touch position of the marker pen 50. In a case of using the eraser 51, the signal level of the capacitance resulting from the eraser 51 has a magnitude about three to five times that of the signal level resulting from the marker pen. However, the signal level of the capacitance differs depending on the touch position to a degree approximately the same as in the case of the marker pen 50.

The capacitance value fluctuates as described above, and therefore, in a case of drawing a diagonal straight line, a line reproduced by concatenating actually obtained pieces of input coordinate data is a line segment having cyclic stepped irregularities, and the pieces of input coordinate data need to be corrected.

Figure 19:
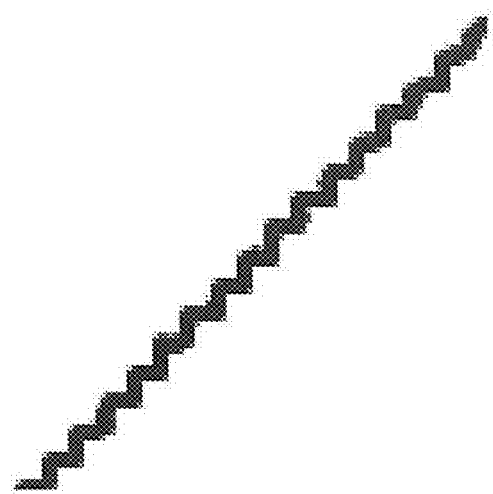
FIG. 19 is a diagram illustrating a drawing result obtained by reproduction using input coordinate data obtained in a case where a diagonal straight line is drawn on a marker board film with a marker pen.

FIG. 19 illustrates a drawing result obtained by reproduction using pieces of input coordinate data obtained in a case where drawing is performed with a marker pen along a ruler that is diagonally placed on the marker board film at an angle of 45 degrees.

The line segment drawn on the marker board film looks straight as a matter of course; however, the drawing result obtained by reproduction is a line segment that undulates in accordance with the sensor pitch and that has cyclic stepped irregularities, as illustrated in FIG. 19.

In the case of drawing a straight line in the diagonal direction as described above, one method for removing the cyclic stepped irregularities is interposing a sheet of glass between the marker board film 1 and the touch sensor 2.

For example, a sheet of glass having a thickness of about 3.2 mm needs to be interposed between the marker board film 1 and the touch sensor 2.

Figure 20:
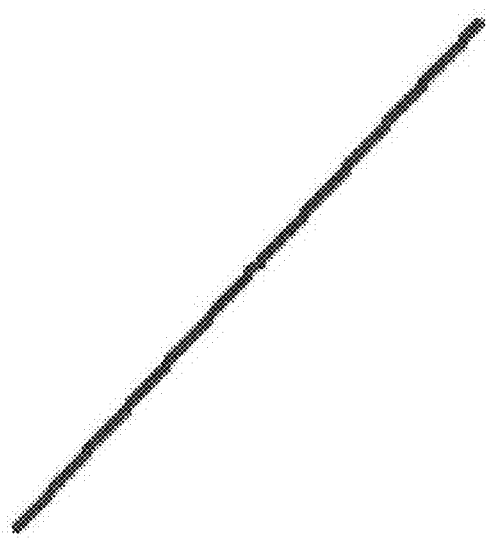
FIG. 20 is a diagram illustrating a drawing result obtained by reproduction in a case of interposing a sheet of glass.

FIG. 20 illustrates a drawing result obtained by reproduction in the case of interposing a sheet of glass.

As described above, when a sheet of glass is interposed, the effect of irregularities is reduced.

In the case of drawing a straight line in the diagonal direction, another method for removing the cyclic stepped irregularities is performing linear approximation for pieces of input coordinate data of the line segment having the stepped irregularities by using a predetermined complementary function.

Figure 21:
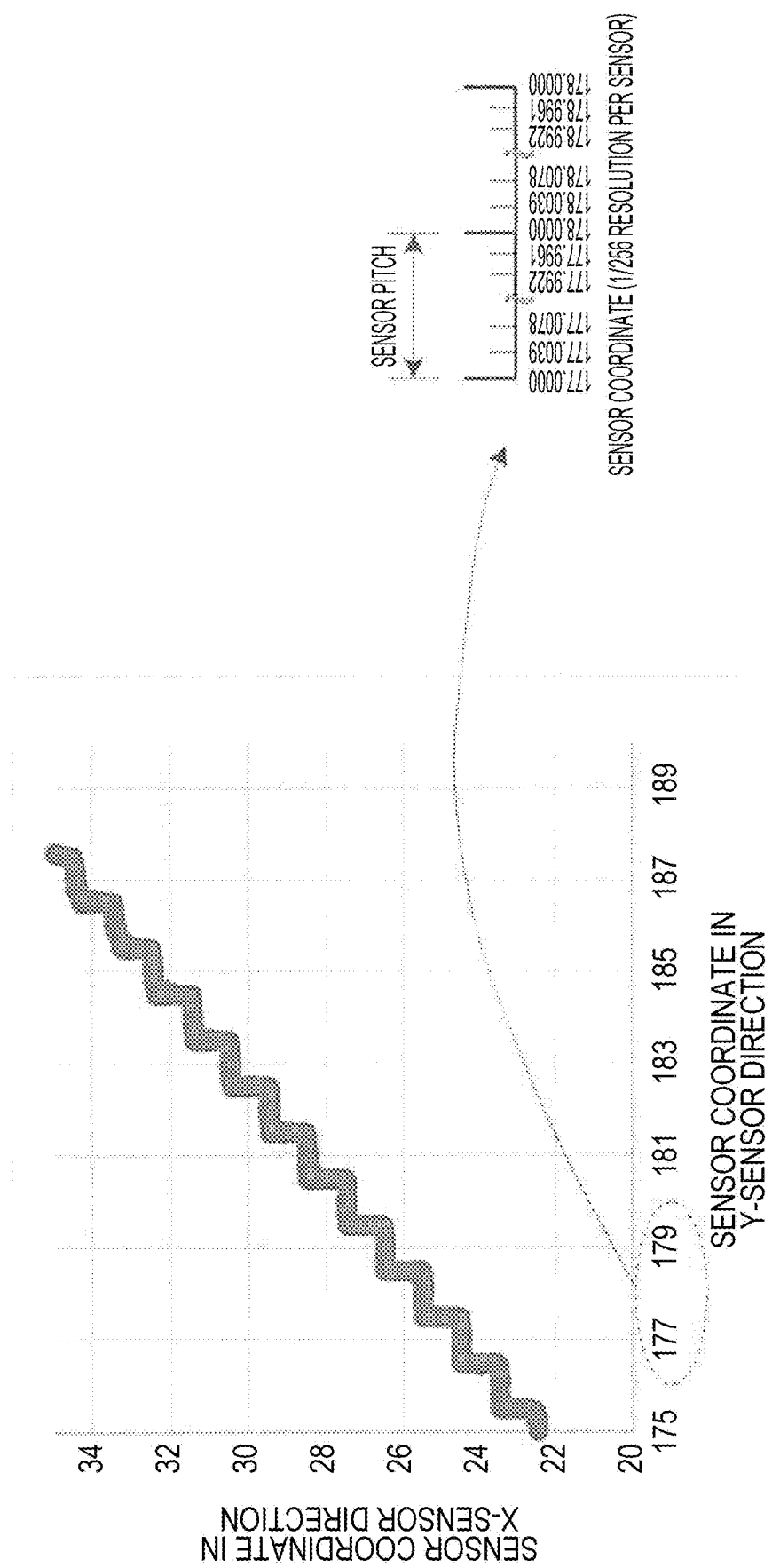
FIG. 21 is a diagram illustrating the drawing result illustrated in FIG. 19 in a coordinate system of an X sensor and a Y sensor.

FIG. 21 is a diagram illustrating the drawing result illustrated in FIG. 19 in a coordinate system of the X sensor and the Y sensor.

In FIG. 21, the horizontal axis represents the sensor coordinate in the Y-sensor direction, and the vertical axis represents the sensor coordinate in the X-sensor direction. Each numeric value corresponds to a number indicating the position of a corresponding sensor.

When it is assumed here that the resolution between adjacent sensors is 2 to the 8th power (256), the minimum unit for the detection position of a touch is 0.0039, as indicated on the right of FIG. 21.

That is, linear approximation is performed for pieces of input coordinate data obtained in units of 0.0039.

Figure 22:
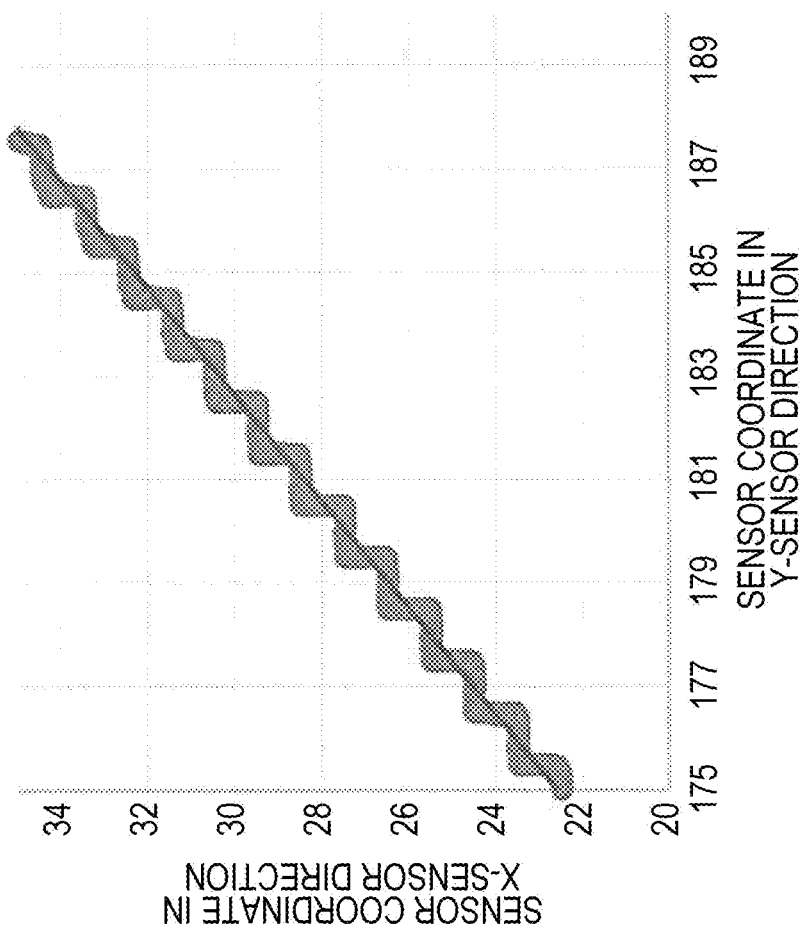
FIG. 22 is a diagram illustrating a drawing result obtained by correcting a line segment having irregularities with an approximate straight line.

When linear approximation is performed, a straight line that extends along the substantially center part of the line segment having stepped irregularities is calculated, as illustrated in FIG. 22.

Therefore, when the obtained pieces of input coordinate data of the line segment having stepped irregularities are replaced with pieces of input coordinate data that correspond to the calculated straight line, the line segment having irregularities is stored as the straight line.

A line segment obtained by reproducing the stored drawing result can be recognized as a straight line similar to the line segment actually drawn on the marker board film.

As the complementary function used in linear approximation, a complementary function used in the related art needs to be used, and a general linear function or a polynomial expression including two or more terms, that is, higher-order terms, may be used.

SECOND EXAMPLE: CONFIGURATION OF WRITING INPUT DEVICE

Figure 18:
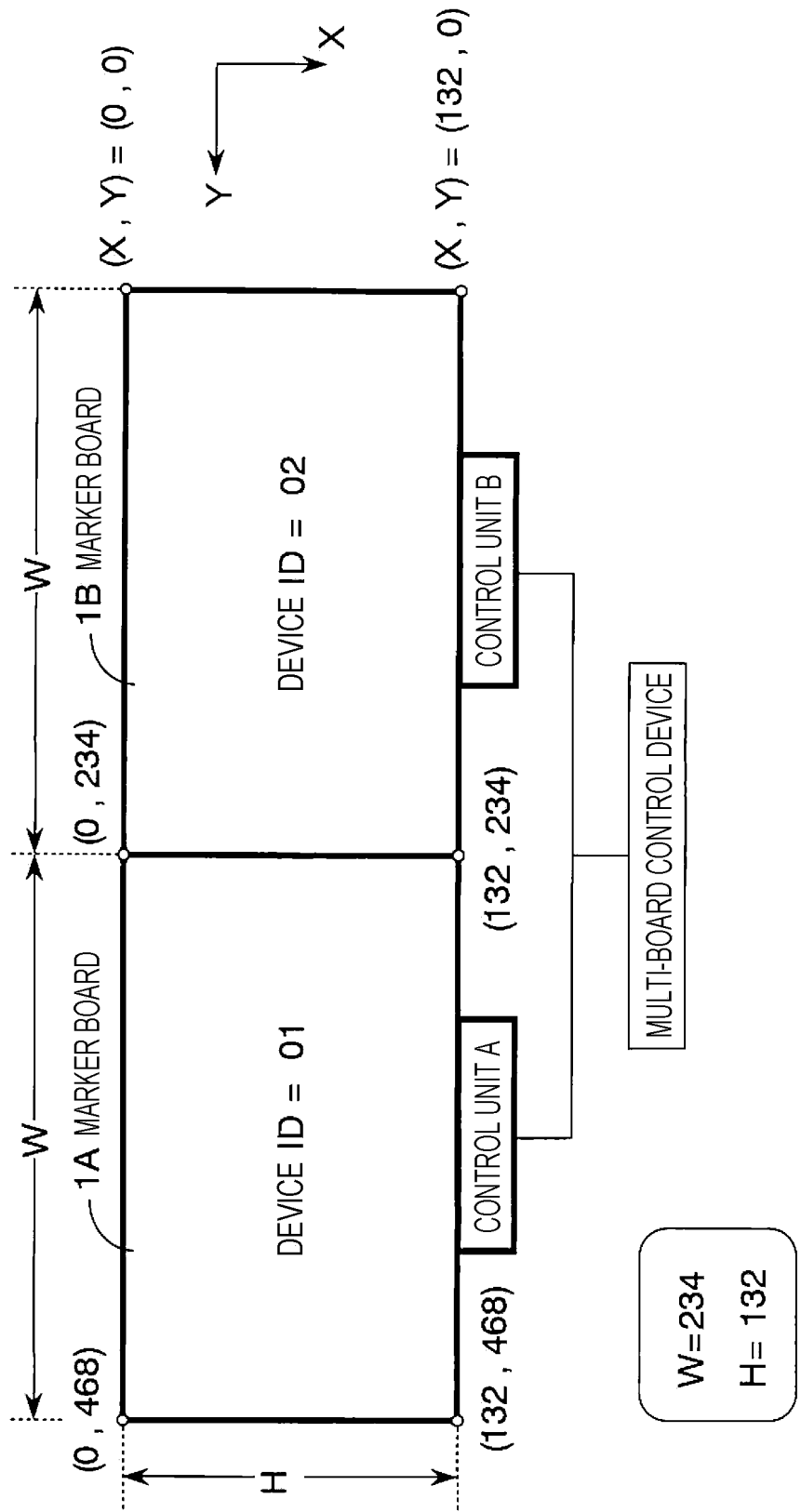
FIG. 18 is a diagram illustrating a configuration of a writing input device according to a second example of the present invention.

FIG. 18 is a diagram illustrating a configuration of a writing input device according to a second example of the present invention.

FIG. 18 illustrates a configuration in which two writing input devices of the present invention are arranged side by side in the lateral direction.

A marker board 1A and a marker board 1B that correspond to the input unit are made to be in contact with each other on the sides thereof to thereby form a multi-input device. As a result, an area for which input by writing can be performed is doubled.

The configuration of the multi-input device is not limited to the configuration in which two devices are arranged side by side. Three or more writing input devices may be combined in the longitudinal and lateral directions so that a writing input system having a larger drawing area can be configured.

The two marker boards (1A and 1B) are respectively controlled by dedicated control units (A and B), and the two control units are configured to be further connected to a multi-board control device.

The multi-board control device is a device that obtains pieces of drawing information input by writing on the two marker boards (1A and 1B) and that converts and saves image data or input coordinate data so that the pieces of drawing information can be processed as one piece of drawing information.

In a case of saving as image data, for example, data for 30720 pixels×8640 pixels, which is an information amount twice the information amount in a case of the configuration of one marker board, is saved.

In a case of saving input coordinate data, the data is saved together with attribute information indicating a device ID because each of the boards outputs data including touch sensor coordinates.

Here, the device IDs are IDs with which the marker board 1A and the marker board 1B can be identified. For example, the device ID of the marker board to needs to be set to 01, and the device ID of the marker board 1B needs to be set to 02. Input coordinate data from each of the marker boards is stored while a corresponding one of the device IDs is added thereto. For example, input coordinate data to which the device ID of 01 is added can be determined to be data written on the marker board 1A.

In a case of reproducing the saved pieces of data, the saved pieces of data can be processed as one piece of drawing information for all of the two marker boards in accordance with the device IDs.

As illustrated in FIG. 18, it may be assumed that the longitudinal direction corresponds to the X axis and the lateral direction corresponds to the Y axis and that the top right position of the marker board 1B is the origin (X, Y)=(0, 0). Then, the position coordinates for the two marker boards may be set in the one coordinate system, and input coordinate data may be obtained.

For example, in a case where the number of dots of one marker board in the lateral direction W is 234 dots and the number of dots thereof in the longitudinal direction H is 132 dots, it is necessary to make the marker board 1A and the marker board 1B be in contact with each other on a straight line part connecting the points (0, 234) and (132, 234), add an offset (234) to the Y coordinate, and assume the top right position of the marker board 1A to be (0, 234) and the bottom left position thereof to be (132, 468).

Accordingly, the user can unconsciously use the marker boards as a wide marker board, and the saved pieces of drawing information can be processed as if the pieces of drawing information correspond to information about one marker board.

THIRD EXAMPLE: CONFIGURATION OF WRITING INPUT DEVICE INCLUDING HARD MARKER BOARD

Now, a form of a writing input device including a hard marker board is described.

Note that a description of a part common to the writing input device including the marker board film of the first example is omitted, and matters not described in this section are similar to those in the first example.

Figure 23:
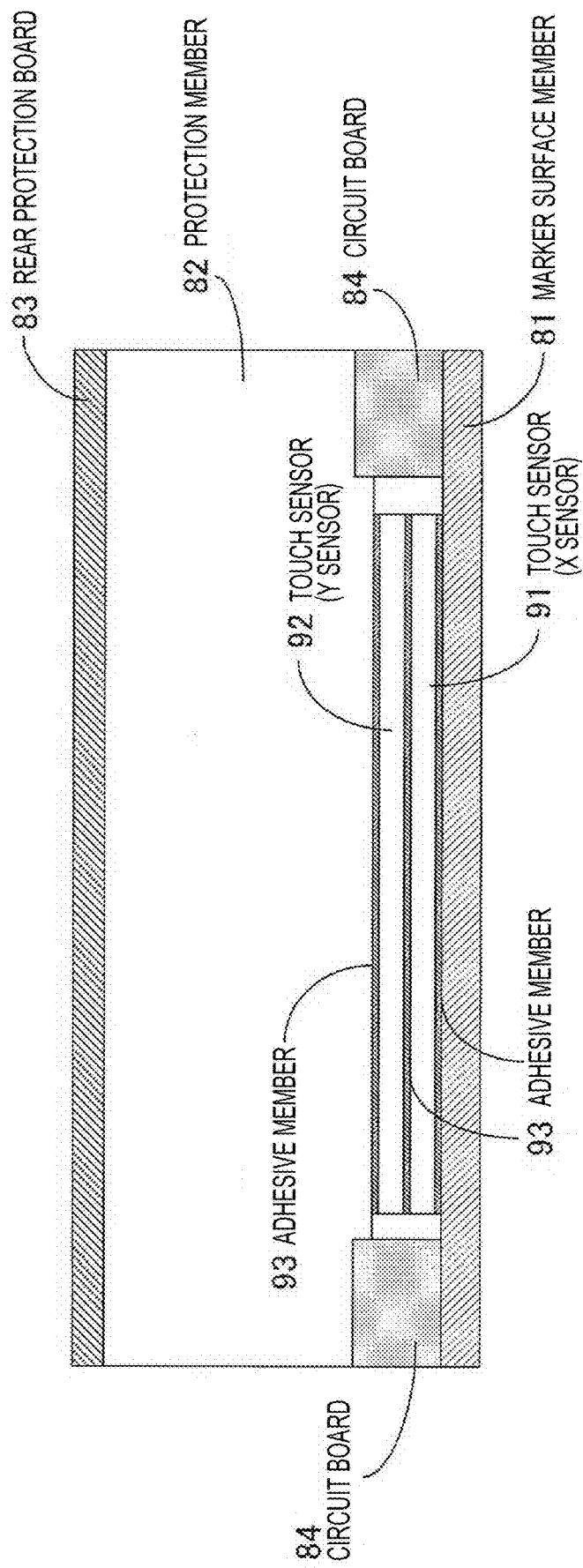
FIG. 23 is a schematic diagram illustrating a configuration of a writing input device according to an example of the present invention.

FIG. 23 schematically illustrates a configuration of a writing input device including a hard marker board according to an example of the present invention.

FIG. 23 is a cross-sectional view of main constituent members of the hard marker board.

The writing input device including the hard marker board is constituted mainly by a marker surface member 81, a protection member 82, a rear protection board 83, a circuit board 84, a touch sensor member (91 and 92), and an adhesive member 93.

The marker surface member 81 is a flat board having a front surface onto which writing information can be entered in ink by writing characters, etc. with a marker pen.

The protection member 82 is a member for protecting the touch sensor member and is disposed at the rear of the marker surface member and on a surface opposite a surface on which the marker surface member and the touch sensor member are in contact with each other.

The rear protection board 83 is a flat board located on the rearmost side of the writing input device to protect the protection member 82.

The circuit board 84 is a board on which an electronic circuit that receives a signal output from the touch sensor and indicating a position at which a marker pen touches the marker surface member 81 and that generates input information corresponding to writing information is mounted.

Therefore, the circuit board 84 corresponds to an input information generation unit that generates input information corresponding to writing information from information about a position at which a marker pen touches the marker surface member.

The touch sensor member is a touch sensor that is disposed on the back surface of the marker surface member and that obtains information about a position at which a marker pen touches the marker surface member 81 at the time of writing.

The touch sensor member is constituted by two capacitive sensors (X sensor 91 and Y sensor 92), each formed of electrode lines orthogonal to the electrode dines of the other.

The X sensor 91 and the Y sensor 92 are stacked between the marker surface member 81 and the protection member 82 and are adhered with the adhesive member 93.

As the adhesive member 93, for example, a double-sided tape needs to be used.

In this embodiment, as the material of the marker surface member 81, a hard marker board is used in place of the marker board film of the first example.

A first reason is as follows. In this embodiment, the sheet-like capacitive touch sensor member (91 and 92) is disposed on the back surface of the marker surface member 81, and an electric circuit is integrated into the touch sensor member. Therefore, it is desirable to use, as the marker surface member, a hard marker board that is robust to stress so as to also prevent a break due to bending from occurring in the electric circuit.

A second reason is as follows. The front surface of the marker surface member is rubbed when entry with a marker pen is performed or when an applied ink is removed, which is true for a general whiteboard that is other than the present invention and that does not include a touch sensor, and therefore, the front surface tends to have scratches. Accordingly, it is desirable to use a hard material on the front surface.

Note that, for a general whiteboard, a metal board having a surface that is enameled or coated with resin is often used; however, in this embodiment, the capacitive touch panel is disposed on the back surface of the marker surface member, and the metal board, which is conductive, adversely affects the detection precision of the touch panel. Therefore, a hard resin is used as the material of the marker surface member 81.

When the thickness of the marker surface member 81 increases, the distance between the front surface on which entry with a marker pen is performed and the touch panel increases, resulting in a decrease in the sensitivity of the touch panel. Therefore, it is desirable to make the marker surface member 81 thinner.

It is desirable that the marker surface member 81 have a thickness of 1 to 10 mm by taking into consideration the sensitivity of the touch panel and the strength of the marker surface member.

As the type of hard resin, specifically, a melamine resin, an acrylic resin, a PET (polyethylene terephthalate) resin, an epoxy resin, etc. can be used.

As a material other than the hard resin, glass can be used. However, glass is easily broken by an external impact and has a heavy weight, which is a disadvantage.

In this embodiment, as the type of hard resin, a melamine resin that excels specifically in robustness and incombustibility is used.

Note that, as the type of hard resin, a composite resin material formed by coating the surface of a substrate mace of a phenol resin, etc. with another type of resin, such as a melamine resin, may be used.

On the back surface of the marker surface member 81, the sheet-like capacitive touch sensor member (91 and 92) is disposed, and the touch sensor member (91 and 92) is attached to the back surface of the marker surface member with the double-sided tape 93.

Further, on the back surface of the touch sensor member, the protection member 82 is disposed.

The protection member 82 has fewer restrictions on the thickness and less necessity for hardness than the marker surface member has.

Meanwhile, it is desirable that the protection member 82 be robust to bending stress and have a light weight.

Accordingly, it is desirable to use a foamed resin material or a corrugated plate as the protection member 82.

As the foamed resin material, specifically, firing polystyrene, firing polyethylene, firing polypropylene, a firing phenolic resin, etc. can be used.

In this embodiment, firing polystyrene is used as the foamed resin material.

As the material of the corrugated plate, paper or wood can be used in addition to various resin materials.

In this embodiment, firing polystyrene is used as the material of the protection member in view of costs and strength.

It is desirable that the thickness of the protection member 82 be larger than that of the marker surface member 81. Specifically, it is desirable that the thickness of the protection member 82 be 10 to 50 mm.

The sheet-like touch sensor (91 and 92) is formed so as to be sandwiched between the marker surface member 81 and the protection member 82 on the front and back surfaces thereof, and therefore, is very robust to bending stress.

In this embodiment, in addition to the touch sensor, also the circuit board 84 is formed so as to be sandwiched between the marker surface member 81 and the protection member 82 on the front and back surfaces thereof, and therefore, is similarly protected from destruction due to bending.

Further, on the back surface of the protection member 82, the thin rear protection board 83 for protecting the surface of the protection member is disposed.

As the rear protection board 83, for example, an aluminum plate is used; however, the material of the rear protection board 83 is not limited to aluminum, and a metal plate other than an aluminum plate or a resin plate may be used.

BRIEF STATEMENT OF EMBODIMENTS

First Embodiment

As illustrated in FIG. 1, the input unit of the writing input device 100 is constituted by the marker board film 1, the touch sensor 2 formed of the capacitive sensor (X) 2a and the capacitive sensor (Y) 2b, and the protection member 3, such as the PET film. In addition to the input unit, the writing input device 100 further includes the control device that obtains, from the input unit, information about writing input.

Accordingly, it is possible to provide a writing input device that can save drawing information input by writing with a simple and low-cost configuration without a need for including a device, such as a scanner, that reads information input by writing.

Second Embodiment

The input unit of the writing input device 100 may be constituted by the marker board film 1 and the touch sensor 2 formed of the capacitive sensor (X) 2a and the capacitive sensor (Y) 2b.

Accordingly, the protection member is not included, and therefore, it is possible to provide a writing input device that is small, light, and portable and for which the user can flexibly set the size and shape.

Third Embodiment

As illustrated in FIG. 18, the multi-writing-input device in which parts corresponding to the input units of a plurality of writing input devices are combined and disposed in the lateral direction or the longitudinal direction may be formed.

Accordingly, it is possible to provide a writing input device having a larger drawing area.

Fourth Embodiment

The configuration in which drawing information saved in the storage unit is transmitted to a predetermined destination may be provided.

Examples of the destination include an email address, a printer, a storage medium, such as a USB memory, an externally installed server, a large-sized display device, a projector, and a control device for a videoconference system.

Accordingly, the reusability of drawing information input by writing can be increased, and a person other than the user who performs writing input can use the drawing information.

Further, when drawing information that is being input by writing is transmitted to a videoconference system in a remote place in real time, the drawing information can be shared.

Fifth Embodiment

The function of extracting character parts from drawing information saved after drawing by the user to recognize characters may be provided. Further, the function of extracting a keyword specified by the user from the result of character recognition may be provided.

Accordingly, the character parts for which characters are recognized can be processed as text information, and therefore, the reusability of the drawing information input by writing can be increased. When characters drawn by the user are recognized, a clean copy of written minutes, etc. can be made and retained. Further, when a keyword is extracted, minutes, etc. can be efficiently filed.

Additional Remarks: The present invention provides a writing input device having the following characteristics.

Additional Remark 1

A writing input device including: a marker surface member that allows entry of writing information in ink onto a front surface by writing with a marker pen; a touch sensor member that is disposed on a back surface of the marker surface member and from which information about a position at which the marker pen touches the marker surface member at a time of the writing is obtained; and an input information generation unit that generates input information corresponding to the writing information from the information about the position at which the marker pen touches the marker surface member.

Additional Remark 2

The writing input device according to Additional Remark 1, in which the touch sensor member is a capacitive touch sensor.

Additional Remark 3

The writing input device according to Additional Remark 2, in which the touch sensor member detects a capacitance change caused by a tip of the marker pen saturated with an ink touching the front surface of the marker surface member.

Additional Remark 4

The writing input device according to Additional Remark 3, in which the ink contains a solvent that contains a main ingredient having a relative permittivity of 10 or more.

Additional Remark 5

The writing input device according to any one of Additional Remarks 1 to 4, in which the marker surface member is formed of a resin material.

Additional Remark 6

The writing input device according to any one of Additional Remarks 1 to 5, in which the marker surface member has a thickness of 1.0 mm or more and 10.0 mm or less.

Additional Remark 7

The writing input device according to Additional Remark 1 or 2, further including a protection member that protects the touch sensor member, the protection member being disposed on a surface of the touch sensor member opposite to a surface of the touch sensor member on which the marker member is located.

Additional Remark 8

The writing input device according to Additional Remark 7, in which the protection member is formed of a foamed resin or a corrugated plate.

Additional Remark 9

The writing input device according to Additional Remark 7 or 8, in which the protection member has a thickness of 10.0 mm or more and 50.0 mm or less.

Additional Remark 10

The writing input device according to Additional Remark 2, in which the input information generation unit determines a touch operation to be an input operation in a case where a capacitance change is larger than a predetermined first threshold and smaller than a predetermined second threshold, and determines a touch operation to be an operation other than an input operation in a case where a capacitance change is a change larger than the second threshold.

Additional Remark 11

The writing input device according to Additional Remark 2 or 10, in which the input information generation unit distinguishes an input operation and an erase operation from each other by using a magnitude of a capacitance change, and in a case where the input information generation unit determines that an erase operation has been performed, erases the input information that corresponds to a part for which the erase operation has been performed.

Additional Remark 12

The writing input device according to Additional Remark 11, in which the erase operation is performed with an erasing member; the erasing member has a size of a predetermined area or more, and includes a conductive member for causing a capacitance change on the marker surface member and a wipe-off part for erasing an ink of the marker pen applied to the marker surface member; and in a case where the erase operation has been performed, the writing information entered onto the front surface of the marker surface member is erased with the wipe-off part, and simultaneously, the input information that corresponds to the part for which the erase operation has been performed is erased.

Additional Remark 13

The writing input device according to Additional Remark 11 or 12, in which the input information generation unit determines a touch operation to be the erase operation with the erasing member in a case where the detected capacitance change is a change having a magnitude that is equal to or larger than the predetermined second threshold within a predetermined distance on the marker surface member or in a case where movement of a touch input position over a predetermined amount of distance or more is detected within a predetermined period, and determines a touch operation to be an operation not intended for drawing in a case where the movement of the touch input position within the predetermined period is movement over a distance shorter than the predetermined amount of distance.

Additional Remark 14

The writing input device according to any one of Additional Remarks 1 to 13, further including an input coordinate correction unit that corrects, in a case where a line segment generated by concatenating a plurality of pieces of input coordinate data that are included in the input information is a line segment having very small cyclic changes, the plurality of pieces of input coordinate data by using a predetermined approximate straight line.

Additional Remark 15

The writing input device according to any one of Additional Remarks 1 to 14, further including a character recognition unit that extracts, by using the input information, a part corresponding to a character, and recognizes the character input by writing.

Additional Remark 16

The writing input device according to any one of Additional Remarks 1 to 15, further including a communication unit that transmits the input information to an external device.

Additional Remark 17

The writing input device according to Additional Remark 16, in which the external device includes a server, a display device, a printer, and a storage medium that are connected via a network.

Additional Remark 18

The writing input device according to any one of Additional Remarks 1 to 17, in which the input information includes input coordinate data of the position at which the marker pen touches the marker surface member and image data generated by using the input coordinate data; and in addition to the input coordinate data, the input information includes attribute information that is information with which a touch state is distinguishable.

Additional Remark 101

A writing input device including: an input unit constituted by a marker board film that allows entry of information by writing and a touch sensor that is disposed on a back surface of the marker board film and from which information about a capacitance at a position touched at a time of the entry is obtained; a capacitance change sensing unit that senses a capacitance change from the information obtained from the touch sensor; a touch position detection unit that detects a position of a touched region on the basis of the sensed capacitance change, and obtains input coordinate data of the position; a shape determination unit that determines a shape of the touched region on the basis of the sensed capacitance change; and a storage unit that stores, on the basis of the obtained input coordinate data and the determined shape, drawing information input by writing.

Additional Remark 102

The writing input device according to Additional Remark 101, in which the touch sensor is constituted by two capacitive sensors each formed of electrode lines that are orthogonal to electrode lines of the other; the two capacitive sensors are stacked and disposed so as to be in contact with the back surface of the marker board film; and information about a capacitance in each region in which a corresponding one of the electrode lines of one of the two capacitive sensors and a corresponding one of the electrode lines of the other capacitive sensor cross each other is obtained.

Accordingly, the input unit is constituted by the marker board film and the touch sensor, and therefore, it is possible to form a writing input device that is small, light, and portable and for which the user can flexibly set the size and shape. When a part corresponding to the input unit is attached to a wall or put on a plate-like member, such as a desk, writing input can be easily performed, and the place of writing input can be flexibly changed.

Additional Remark 103

The writing input device according to Additional Remark 101 or 102, in which a protection member for protecting the touch sensor is stacked and disposed so as to be in contact with the touch sensor on a surface of the touch sensor different from a surface of the touch sensor that is in contact with the marker board film.

Additional Remark 104

The writing input device according to any one of Additional Remarks 101 to 103, in which the shape determination unit determines a touch operation to be a writing input operation in a case where the sensed capacitance change is larger than a predetermined first threshold and smaller than a predetermined second threshold, and determines a touch operation to be an operation other than a writing input operation in a case where the sensed capacitance change is a change larger than the second threshold.

Accordingly, it is determined whether a touch is a touch of a marker pen or a touch of an object other than a marker pen, and therefore, it is possible to automatically determine whether the user is performing a writing input operation or performing an operation other than a writing input operation.

Additional Remark 105

The writing input device according to Additional Remark 104, in which the shape determination unit determines a touch operation to be an erase operation with an erasing member in a case where the sensed capacitance change is a change having a magnitude that is equal to or larger than the predetermined second threshold within a predetermined distance on the marker board film or in a case where movement of a touch input position over a predetermined amount of distance or more is detected within a predetermined period, and determines a touch operation to be an operation not intended for drawing in a case where the movement of the touch input position within the predetermined period is movement over a distance shorter than the predetermined amount of distance.

Additional Remark 106

The writing input device according to Additional Remark 105, in which the erasing member has a size of a predetermined area or more, and includes a conductive member for the capacitance change sensing unit to detect a capacitance change and a felt member for erasing an ink of a marker pen applied to the marker board film; and in a case where an erase operation of erasing writing information already entered onto the marker board film has been performed with the erasing member, the writing information that corresponds to a part for which the erase operation has been performed is erased with the felt member, and in the drawing information stored in the storage unit, the drawing information that corresponds to the writing information corresponding to the part for which the erase operation has been performed is erased.

Accordingly, the drawing information that corresponds to the writing information corresponding to the part intentionally erased by the user is erased from the storage unit, and therefore, it is possible to automatically match the writing information that remains on the marker board film and the drawing information stored in the storage unit.

Depending on the method for disposing sensor electrodes, cyclic mismatches may be observed between drawing coordinates and output coordinates. Therefore, a coordinate transformation may be performed by using a coordinate transformation expression obtained in advance. The cyclic mismatches appear as a line segment having very small cyclic changes.

Additional Remark 107

The writing input device according to any one of Additional Remarks 101 to 106, further including an input coordinate correction unit that corrects, in a case where a line segment generated by concatenating a plurality of pieces of input coordinate data that are included in the drawing information stored in the storage unit is a line segment having very small cyclic changes, the plurality of pieces of input coordinate data by using a predetermined approximate straight line.

Accordingly, the pieces of input coordinate data of a line segment having very small cyclic changes are corrected by using the predetermined approximate straight line, and therefore, in a case of reproducing the drawing information stored in the storage unit, it is possible to reproduce the drawing information as a line segment having very small cyclic changes to a small degree similar to the line segment written on the marker board film.

Additional Remark 108

The writing input device according to any one of Additional Remarks 101 to 107, further including a character recognition unit that extracts, by using the drawing information stored in the storage unit, a part corresponding to a character, and recognizes the character input by writing.

Accordingly, in the drawing information stored in the storage unit, a character part is recognized, and therefore, it is possible to retain character information input by writing as a clean copy, edit the recognized character part, and increase the reusability of the character information input by writing.

Additional Remark 109

The writing input device according to any one of Additional Remarks 101 to 108, further including a communication unit that transmits, to an external device, the drawing information stored in the storage unit or information currently entered onto the marker board film by writing.

Additional Remark 110

The writing input device according to Additional Remark 109, in which the external device includes a server, a display device, a printer, and a storage medium that are connected via a network.

Accordingly, the drawing information stored in the storage unit is transmitted to the external device, and therefore, it is possible to use the drawing information in the external device other than the writing input device and increase the reusability of information input by writing.

Additional Remark 111

The writing input device according to any one of Additional Remarks 101 to 110, in which the drawing information stored in the storage unit includes the input coordinate data obtained by the touch position detection unit and image data generated by using the input coordinate data; and attribute information that is information with which a touch state is distinguishable is stored in addition to the input coordinate data.

Accordingly, it is possible to easily reproduce the drawing information input by writing by using the image data or the input coordinate data and attribute information.

REFERENCE SIGNS LIST 1 marker board film
1A marker board
1B marker board
2 touch sensor
2a capacitive sensor (X sensor)
2b capacitive sensor (Y sensor)
3 protection member
3a PET film
10 input unit
11 sensor driving unit
12 capacitance change sensing unit
13 shape determination unit
14 touch position detection unit
15 movement amount obtaining unit
16 communication unit
17 input coordinate correction unit
20 storage unit
21 input coordinate data
22 image data
30 external device
31 display device
32 printer
33 server
40 network
51 erasing member (eraser)
52 conductive member
53 nonconductive member
54 felt member
81 marker surface member
82 protection member
83 rear protection board
84 circuit board
91 touch sensor member (X sensor)
92 touch sensor member (Y sensor)
93 adhesive member
100 input device

The invention claimed is:

1. A writing input device comprising:
a marker surface member that allows entry of writing information in ink onto a front surface by writing with a marker pen;
a touch sensor member that is disposed on a back surface of the marker surface member and from which information about a position at which the marker pen touches the marker surface member at a time of the writing is obtained;
a memory that stores instructions; and
a processor that executes the instructions stored in the memory to generate input information corresponding to the writing information from the information about the position at which the marker pen touches the marker surface member, wherein
the touch sensor member is a capacitive touch sensor, and
a tip of the marker pen saturated with an ink touching the front surface of the marker surface member, and the ink is applied on the front surface of the marker surface member,
the touch sensor member detects a capacitance change caused by the tip of the marker pen saturated with the ink touching the front surface of the marker surface member, and
the processor generates an information of the shape of the ink applied on the front surface of the marker surface, based on the capacitance change that the touch sensor member detected, as the input information.

2. The writing input device according to claim 1, wherein the ink contains a solvent that contains a main ingredient having a relative permittivity of 10 or more.

3. The writing input device according to claim 1, wherein the marker surface member is formed of a resin material.

4. The writing input device according to claim 1, wherein the marker surface member has a thickness of 1.0 mm or more and 10.0 mm or less.

5. The writing input device according to claim 1, further comprising
a protection member that protects the touch sensor member, the protection member being disposed on a surface of the touch sensor member opposite to a surface of the touch sensor member on which the marker member is located.

6. The writing input device according to claim 5, wherein the protection member is formed of a foamed resin or a corrugated plate.

7. The writing input device according to claim 5, wherein the protection member has a thickness of 10.0 mm or more and 50.0 mm or less.

8. The writing input device according to claim 1, wherein a touch operation is determined to be an input operation in a case where a capacitance change is larger than a predetermined first threshold and smaller than a predetermined second threshold, and a touch operation is determined to be an operation other than an input operation in a case where a capacitance change is a change larger than the second threshold.

9. The writing input device according to claim 1, wherein
   an input operation and an erase operation are distinguished from each other by using a magnitude of a capacitance change, and
   in a case where performance of an erase operation is detected, the input information that corresponds to a part for which the erase operation has been performed is erased.

10. The writing input device according to claim 9, wherein
    the erase operation is performed with an erasing member,
    the erasing member has a size of a predetermined area or more, and includes a conductive member for causing a capacitance change on the marker surface member and a wipe-off part for erasing an ink of the marker pen applied to the marker surface member, and
    in a case where the erase operation has been performed, the writing information entered onto the front surface of the marker surface member is erased with the wipe-off part, and simultaneously, the input information that corresponds to the part for which the erase operation has been performed is erased.

11. The writing input device according to claim 1, the processor further executes the instruction to transmit the input information to an external device.

12. The writing input device according to claim 1, wherein
    the input information includes input coordinate data of the position at which the marker pen touches the marker surface member and image data generated by using the input coordinate data, and
    in addition to the input coordinate data, the input information includes attribute information that is information with which a touch state is distinguishable.

* * * * *